(12) United States Patent
Asai et al.

(10) Patent No.: US 12,379,072 B2
(45) Date of Patent: Aug. 5, 2025

(54) HYDROGEN GAS INVENTORY ACQUISITION METHOD, HYDROGEN GAS INVENTORY ACQUISITION DEVICE, HYDROGEN GAS INVENTORY ACQUISITION SYSTEM, AND HYDROGEN GAS INVENTORY MANAGEMENT SYSTEM

(71) Applicant: ENEOS CORPORATION, Tokyo (JP)

(72) Inventors: Shigeru Asai, Tokyo (JP); Tadashi Seike, Tokyo (JP); Shuuichi Suzuki, Tokyo (JP); Nanako Obata, Tokyo (JP); Takayuki Itabashi, Tokyo (JP); Seiji Maeda, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 937 days.

(21) Appl. No.: 17/441,900

(22) PCT Filed: Mar. 25, 2020

(86) PCT No.: PCT/JP2020/013458
§ 371 (c)(1),
(2) Date: Sep. 22, 2021

(87) PCT Pub. No.: WO2020/196668
PCT Pub. Date: Oct. 1, 2020

(65) Prior Publication Data
US 2022/0018498 A1 Jan. 20, 2022

(30) Foreign Application Priority Data
Mar. 27, 2019 (JP) .................... 2019-061870

(51) Int. Cl.
*F17C 5/06* (2006.01)
*F17C 13/02* (2006.01)
*G06Q 50/06* (2012.01)

(52) U.S. Cl.
CPC .............. *F17C 13/023* (2013.01); *F17C 5/06* (2013.01); *F17C 13/025* (2013.01);
(Continued)

(58) Field of Classification Search
CPC ........ F28C 13/023; F17C 5/06; F17C 13/025; F17C 13/026; F17C 221/012;
(Continued)

(56) References Cited

U.S. PATENT DOCUMENTS 5,586,050 A * 12/1996 Makel ................ G06Q 50/06
705/413
7,921,883 B2 * 4/2011 Cohen ................ F17C 5/007
700/83

(Continued)

FOREIGN PATENT DOCUMENTS

CN 101418907 4/2009
JP 11-306424 11/1999
(Continued)

OTHER PUBLICATIONS

Office Action issued in Corresponding JP Patent Application No. 2021-509540, dated Nov. 28, 2023, along with an English translation thereof.

(Continued)

*Primary Examiner* — Patrick H Mackey
(74) *Attorney, Agent, or Firm* — Greenblum & Bernstein, P.L.C.

(57) ABSTRACT

A hydrogen gas inventory acquisition system configured to acquire an inventory of a hydrogen gas in a plurality of off-site hydrogen stations, includes a log data creation device configured to create log data obtained by recording each parameter data sampled at an individual sampling timing set to each hydrogen station of the plurality of off-site hydrogen stations in combination with identification infor- (Continued)

mation of each of the plurality of off-site hydrogen stations from a plurality of parameter data measured by a plurality of meters disposed in the each hydrogen station to calculate an inventory of the hydrogen gas in the each hydrogen station; an inventory calculation device configured to calculate the inventory of the hydrogen gas at an individual calculation timing set to the each hydrogen station by using the log data; and a sorting device configured to acquire inventory data of the hydrogen gas in the each hydrogen station.

15 Claims, 15 Drawing Sheets

(52) U.S. Cl.
CPC ........... *F17C 13/026* (2013.01); G06Q 50/06 (2013.01); *F17C 2221/012* (2013.01); *F17C 2250/032* (2013.01); *F17C 2250/0439* (2013.01); *F17C 2250/0473* (2013.01)

(58) Field of Classification Search
CPC ...... F17C 2250/0439; F17C 2250/0473; F17C 1/00; G06Q 50/06; G06Q 10/00; G06Q 10/08; G06Q 10/0832; G06Q 10/087
See application file for complete search history.

(56) References Cited

U.S. PATENT DOCUMENTS

| | | | |
|---|---|---|---|
| 2010/0154924 A1 | 6/2010 | Casey | |
| 2011/0093305 A1* | 4/2011 | Alexander | G06Q 10/06311 705/7.13 |
| 2011/0259469 A1 | 10/2011 | Harty et al. | |
| 2017/0074707 A1* | 3/2017 | Mathison | G01F 22/02 |
| 2020/0182410 A1* | 6/2020 | Mathison | F17C 13/02 |

FOREIGN PATENT DOCUMENTS

| | | |
|---|---|---|
| JP | 2015-214994 | 12/2015 |
| JP | 2016-89927 | 5/2016 |
| JP | 2016-196367 | 11/2016 |
| JP | 2017-9069 | 1/2017 |
| JP | 2017009069 A * | 1/2017 |
| JP | 2017-194745 | 10/2017 |
| JP | 2018-84329 | 5/2018 |
| JP | 6356626 B2 * | 7/2018 |
| JP | 2018-162851 | 10/2018 |
| JP | 6480276 B2 * | 3/2019 |
| JP | 2019-61870 | 4/2019 |

OTHER PUBLICATIONS

International Search Report issued in International Patent Application No. PCT/JP2020/013458, dated Jun. 9, 2020, along with an English translation thereof.
International Preliminary Report on Patentability issued in International Patent Application No. PCT/JP2020/013458, dated Sep. 28, 2021, along with an English translation thereof.
Office Action issued in Corresponding Chinese Patent Application No. 202080025058.5, dated Jul. 5, 2022, along with an English translation thereof.
Extended European Search Report Issued in Corresponding EP Patent Application No. 20777172.6, dated Nov. 8, 2022.
Office Action Issued in Corresponding Australian Patent Application No. 2020247428, dated Nov. 10, 2022.
Office Action issued in Corresponding Australian Patent Application No. 2020247428, dated Oct. 25, 2023.
Office Action issued in Corresponding Australian Patent Application No. 2020247428, dated May 31, 2023.
Office Action issued in Corresponding JP Patent Application No. 2024-062935, dated May 20, 2025, along with an English translation thereof.
Office Action issued in Corresponding EP Patent Application No. 20777172.6, dated Mar. 24, 2025.

* cited by examiner

| Header | Log Data A | | | | |
|---|---|---|---|---|---|
| Time | Trailer P1 | Intermediate Accumulator P2,T2 | High-Pressure Accumulator P3,T3 | Ambient Temperature T | Compressor ON/OFF |
| ⋮ | ⋮ | ⋮ | ⋮ | ⋮ | ON |
| ⋮ | ⋮ | ⋮ | ⋮ | ⋮ | OFF |
| ⋮ | ⋮ | ⋮ | ⋮ | ⋮ | ON |
| ⋮ | ⋮ | ⋮ | ⋮ | ⋮ | OFF |

Inventory Calculation (top)

Inventory Calculation (bottom)

FIG.6

| Header | Log Data B | | | | | | |
|---|---|---|---|---|---|---|---|
| Time | Ambient Temperature T | Intermediate Accumulator P2,T2 | High-pressure Accumulator P3,T3 | Trailer P1 | Filling Initiation/ Termination | Filling Amount Q |
| . | . | . | . | . | | . |
| . | . | . | . | . | Initiation | . |
| . | . | . | . | . | | . |
| . | . | . | . | . | | . |
| . | . | . | . | . | Termination | . |
| . | . | . | . | . | | |
| . | . | . | . | . | Initiation | . |
| . | . | . | . | . | | . |
| . | . | . | . | . | | . |
| . | . | . | . | . | Termination | . |

Inventory Calculation (Initiation → Termination), Inventory Calculation (Initiation → Termination)

FIG.7

| Header | Log Data C | | | | |
|---|---|---|---|---|---|
| Time | Trailer P1 | Intermediate Accumulator P2,T2 | Number of Times of Accumulation in Intermediate Accumulator | High-pressure Accumulator P3,T3 | Ambient Temperature T |
| . . . . . | . . . . . | . . . . . | 0 | . . . . . | . . . . . |
| . . . . . | . . . . . | . . . . . | 0 | . . . . . | . . . . . |
| . . . . . | . . . . . | . . . . . | 0 | . . . . . | . . . . . |
| . . . . . | . . . . . | . . . . . | 0 | . . . . . | . . . . . |
| . . . . . | . . . . . | . . . . . | 1 | . . . . . | . . . . . | ← Inventory Calculation
| . . . . . | . . . . . | . . . . . | 1 | . . . . . | . . . . . |
| . . . . . | . . . . . | . . . . . | 1 | . . . . . | . . . . . |
| . . . . . | . . . . . | . . . . . | 1 | . . . . . | . . . . . |
| . . . . . | . . . . . | . . . . . | 1 | . . . . . | . . . . . |
| . . . . . | . . . . . | . . . . . | 2 | . . . . . | . . . . . | ← Inventory Calculation
| . . . . . | . . . . . | . . . . . | 2 | . . . . . | . . . . . |
| . . . . . | . . . . . | . . . . . | 2 | . . . . . | . . . . . |
| . . . . . | . . . . . | . . . . . | 2 | . . . . . | . . . . . |
| . . . . . | . . . . . | . . . . . | 2 | . . . . . | . . . . . |
| . . . . . | . . . . . | . . . . . | 2 | . . . . . | . . . . . |

FIG.8

| Time Period | Order | Off-site ST Identifier | Inventory (kg) |
|---|---|---|---|
| ⋮ | ⋮ | ⋮ | ⋮ |
| 13:00-13:59 | 1 | C | M1 |
| 13:00-13:59 | 2 | D | M2 |
| 13:00-13:59 | 3 | A | M3 |
| ⋮ | ⋮ | ⋮ | ⋮ |
| 13:00-13:59 | n | K | Mn |
| 14:00-14:59 | 1 | C | m1 |
| 14:00-14:59 | 2 | A | m2 |
| 14:00-14:59 | 3 | F | m3 |
| ⋮ | ⋮ | ⋮ | ⋮ |
| 14:00-14:59 | n | G | mn |
| ⋮ | ⋮ | ⋮ | ⋮ |

FIG.9

| Time Period | Area | Off-site ST Identifier | Total Inventory (kg) |
|---|---|---|---|
| ⋮ | 1 | ⋮ | ⋮ |
|  | 2 |  |  |
|  | ⋮ |  |  |
| 13:00-13:59 | 1 | A,B,C | MM1 |
|  | 2 | D,E | MM2 |
|  | ⋮ | ⋮ | ⋮ |
|  | N | O,P,Q,R | MMn |
| ⋮ | 1 | ⋮ | ⋮ |
|  | 2 |  |  |
|  | ⋮ |  |  |

FIG.10

| Time Period | Order | Off-site ST Identifier | Total Inventory (kg) | Trailer Inventory (kg) | Intermediate Accumulator Inventory (kg) | High-pressure Accumulator Inventory (kg) |
|---|---|---|---|---|---|---|
| ⋮ | ⋮ | ⋮ | ⋮ | ⋮ | ⋮ | ⋮ |
| 13:00-13:59 | 1 | C | M1 | M1a | M1b | M1c |
| 13:00-13:59 | 2 | D | M2 | M2a | M2b | M2c |
| 13:00-13:59 | 3 | A | M3 | M3a | M3b | M3c |
| ⋮ | ⋮ | ⋮ | ⋮ | ⋮ | ⋮ | ⋮ |
| 13:00-13:59 | n | K | Mn | Mna | Mnb | Mnc |
| 14:00-14:59 | 1 | C | m1 | m1a | m1b | m1c |
| 14:00-14:59 | 2 | A | m2 | m2a | m2b | m2c |
| 14:00-14:59 | 3 | F | m3 | m3a | m3b | m3c |
| ⋮ | ⋮ | ⋮ | ⋮ | ⋮ | ⋮ | ⋮ |
| 14:00-14:59 | n | G | mn | mna | mnb | mnc |
| ⋮ | ⋮ | ⋮ | ⋮ | ⋮ | ⋮ | ⋮ |

FIG.14

| Time Period | Order | Off-site ST Inventory | Trailer Pressure (MPa) | Intermediate Accumulator Pressure (MPa) | High-pressure Accumulator Pressure (MPa) |
|---|---|---|---|---|---|
| ⋮ | ⋮ | ⋮ | ⋮ | ⋮ | ⋮ |
| 13:00-13:59 | 1 | C | P1a | P1b | P1c |
| 13:00-13:59 | 2 | D | P2a | P2b | P2c |
| 13:00-13:59 | 3 | A | P3a | P3b | P3c |
| ⋮ | ⋮ | ⋮ | ⋮ | ⋮ | ⋮ |
| 13:00-13:59 | n | K | Pna | Pnb | Pnc |
| 14:00-14:59 | 1 | C | p1a | p1b | p1c |
| 14:00-14:59 | 2 | A | p2a | p2b | p2c |
| 14:00-14:59 | 3 | F | p3a | p3b | p3c |
| ⋮ | ⋮ | ⋮ | ⋮ | ⋮ | ⋮ |
| 14:00-14:59 | n | G | pna | pnb | pnc |
| ⋮ | ⋮ | ⋮ | ⋮ | ⋮ | ⋮ |

FIG.15

HYDROGEN GAS INVENTORY ACQUISITION METHOD, HYDROGEN GAS INVENTORY ACQUISITION DEVICE, HYDROGEN GAS INVENTORY ACQUISITION SYSTEM, AND HYDROGEN GAS INVENTORY MANAGEMENT SYSTEM

TECHNICAL FIELD

This application is based upon and claims the benefit of priority from prior Japanese Patent Application No. JP2019-061870 (application number) filed on Mar. 27, 2019 in Japan, the contents of which are incorporated herein.

The present invention relates to a hydrogen gas inventory acquisition method, a hydrogen gas inventory acquisition device, and a hydrogen gas inventory acquisition system, and relates to a method of acquiring an inventory of a hydrogen gas disposed, for example, in an off-site hydrogen station.

BACKGROUND ART

In recent years, as a fuel for automobiles, a hydrogen fuel has attracted attention as a clean energy source in addition to conventional fuel oils such as gasoline. Along with this, development of a fuel cell vehicle (FCV) using the hydrogen fuel as a drive source has been in progress. Examples of a hydrogen station for the FCV include a hydrogen shipping center or an on-site hydrogen station (hereinafter, referred to as "on-site ST") that becomes the base of hydrogen production, and an off-site hydrogen station (hereinafter, referred to as "off-site ST") that receives hydrogen from the hydrogen production base (the hydrogen shipping center, the on-site ST, or the like) and sells the hydrogen. In order to rapidly fill the FCV with a hydrogen gas, a compressor that compresses the hydrogen gas to a high pressure, and a plurality of accumulators (multi-stage accumulators) which accumulate the hydrogen gas compressed to a high pressure by the compressor are disposed in the hydrogen station. This hydrogen station rapidly fills a fuel tank with the hydrogen gas from the accumulators by performing the filling while appropriately switching the accumulators which are used so that a difference pressure between a pressure inside the accumulators and a pressure of the fuel tank of the FCV is maintained to be large (for example, refer to Patent Literature 1).

Here, in the related art, in each off-site ST, a worker manually reads various pieces of information (for example, a pressure and a temperature) of facilities such as the accumulators disposed in the off-site ST from each meter (for example, a pressure gauge or a thermometer), writes the information in a data sheet, and transmits the information to a management organization at the head office. Therefore, a reading error due to the worker occurs. Particularly, in the case of reading a numerical value from an analog meter, a large error may occur. In addition, for every off-site ST, the meter that is installed is different, and reading timing is also different. Accordingly, there is a problem that it is difficult to accurately grasp a real-time inventory of the hydrogen gas stocked in each off-site ST from the obtained data. As a result, it should rely on experience as to when and how much hydrogen gas should be transported to which off-site ST. Therefore, it is desirable to grasp the inventory of the hydrogen gas in each off-site ST with high accuracy.

Prior Art Documents

Patent Literature

Patent Literature 1: JP-A-2016-89927

SUMMARY OF INVENTION

Technical Problem

Here, an object of an aspect of the invention is to provide a method, a device, and a system which are capable of acquiring an inventory of a hydrogen gas in each off-site ST with high accuracy.

Solution to Problem

According to one aspect of the present invention, a hydrogen gas inventory acquisition system configured to acquire an inventory of a hydrogen gas in a plurality of off-site hydrogen stations, the system includes:

a log data creation device configured to create log data obtained by recording each parameter data sampled at an individual sampling timing set to each hydrogen station of the plurality of off-site hydrogen stations in combination with identification information of each of the plurality of off-site hydrogen stations from a plurality of parameter data measured by a plurality of meters disposed in the each hydrogen station to calculate an inventory of the hydrogen gas in the each hydrogen station;

an inventory calculation device configured to calculate the inventory of the hydrogen gas at an individual calculation timing set to the each hydrogen station by using the log data;

a sorting device configured to acquire inventory data of the hydrogen gas in the each hydrogen station from the inventory calculation device for each set time period, and configured to sort the identification information by using the inventory; and a sorting data output device configured to output sorting data including a sorted identification information and the inventory data from the sorting device.

In addition, the each hydrogen station may pertain to any one group among a plurality of groups, and the system may further include, an inventory-per-group creation device configured to create inventory-per-group data by aggregating an inventory of each hydrogen station pertaining to a group among the plurality of groups for the group, and an inventory-per-group data transmission device configured to transmit the inventory-per-group data to the each hydrogen station.

In addition, the each hydrogen station may include an accumulator configured to accumulate a hydrogen gas, and the plurality of parameter data may include pressure data of the hydrogen gas inside the accumulator, and temperature data capable of being estimated as a temperature of the hydrogen gas inside the accumulator.

In addition, the each hydrogen station may include a compressor configured to compress a hydrogen gas, and the individual calculation timing is an operation stoppage timing of the compressor.

In addition, the individual calculation timing may be time when supply of the hydrogen gas to a fuel cell vehicle is terminated.

In addition, the each hydrogen station may include an intermediate accumulator configured to accumulate a hydrogen gas unloaded from a trailer configured to transport the hydrogen gas, and a high-pressure accumulator configured to accumulate a hydrogen gas compressed to a higher pressure in comparison to the intermediate accumulator, and as the individual calculation timing, termination time of unloading of the hydrogen gas from the trailer to the intermediate accumulator may be used.

In addition, the log data creation device may be disposed in the each hydrogen station, the inventory calculation device is disposed in a data center different from the each hydrogen station, and the log data creation device and the inventory calculation device may be connected to each other over a network.

In addition, the log data creation device and the inventory calculation device may be disposed in the each hydrogen station.

According to another aspect of the present invention, a hydrogen gas inventory acquisition method of acquiring an inventory of a hydrogen gas in a plurality of off-site hydrogen stations, the method includes:

creating log data obtained by recording each parameter data sampled at an individual sampling timing set to each hydrogen station of the plurality of off-site hydrogen stations in combination with identification information of the each hydrogen station from a plurality of parameter data measured by a plurality of meters disposed in the each hydrogen station to calculate an inventory of the hydrogen gas in the each hydrogen station;

calculating the inventory of the hydrogen gas at an individual calculation timing set to the each hydrogen station by using the log data;

acquiring inventory data of the hydrogen gas in the each hydrogen station on the basis of the inventory calculated in the calculating the inventory for each set time period, and sorting the identification information by using the inventory; and outputting sorting data including a sorted identification information and the inventory data.

According to further another aspect of the present invention, a hydrogen gas inventory acquisition device configured to acquire an inventory of a hydrogen gas in a plurality of off-site hydrogen stations, the device includes:

a log data creation unit configured to create log data obtained by recording each parameter data sampled at an individual sampling timing set to each hydrogen station of the plurality of off-site hydrogen stations in combination with identification information of the each hydrogen station from a plurality of parameter data measured by a plurality of meters disposed in the each hydrogen station to calculate an inventory of the hydrogen gas in the each hydrogen station;

an inventory calculation unit configured to calculate the inventory of the hydrogen gas at an individual calculation timing set to the each hydrogen station by using the log data;

a sorting unit configured to acquire inventory data of the hydrogen gas in the each hydrogen station from the inventory calculation unit for each set time period, and configured to sort the identification information by using the inventory; and a sorting data output unit configured to output sorting data including a sorted identification information and the inventory data from the sorting unit.

According to further another aspect of the present invention, a hydrogen gas inventory management system configured to manage an inventory of a hydrogen gas in a plurality of off-site hydrogen stations, the system includes:

a log data creation device configured to create log data obtained by recording a pressure value sampled at an individual sampling timing set to each hydrogen station of the plurality of off-site hydrogen stations in combination with identification information of the each hydrogen station from pressure values measured by a pressure gauge disposed in the each hydrogen station;

a sorting device configured to acquire the pressure value of the hydrogen gas in the each hydrogen station from the log data creation device for each set time period, and configured to sort the identification information by using the pressure value; and a sorting data output device configured to output sorting data including a sorted identification information and the pressure value from the sorting device.

According to further another aspect of the present invention, a hydrogen gas inventory acquisition method includes:

inputting log data of a plurality of parameters sampled from data of the plurality of parameters measured by a plurality of meters disposed in a hydrogen station among a plurality of off-site hydrogen stations configured to supply a hydrogen gas to a fuel cell vehicle (FCV), at a first individual timing set in advance to a terminal in the hydrogen station among a plurality of first individual timings set in advance to a plurality of terminals in the plurality of off-site hydrogen stations in combination with identification information of the hydrogen station through the terminal in the hydrogen station over a network for each hydrogen station among the plurality of off-site hydrogen stations;

calculating an inventory of the hydrogen gas at a second individual timing set in advance to the hydrogen station among a plurality of second individual timings set in advance to the plurality of off-site hydrogen stations by using an input log data of the plurality of parameters for the each hydrogen station;

inputting the inventory of the hydrogen gas in the hydrogen station in which the second individual timing is included in a time period for each time period set in advance, and sorting a plurality of identification information of the plurality of off-site hydrogen stations in the order of less inventory at the time period for each time period; and outputting a plurality of sorted identification information of the plurality of off-site hydrogen stations in association with the inventory for each time period.

According to further another aspect of the present invention, a hydrogen gas inventory acquisition device includes:

a data input unit configured to input log data of a plurality of parameters sampled from data of the plurality of parameters measured by a plurality of meters disposed in a hydrogen station among a plurality of off-site hydrogen stations which supply a hydrogen gas to a fuel cell vehicle (FCV), at a first individual timing set in advance to a terminal in the hydrogen station among a plurality of first individual timings set in advance to a plurality of terminals in the plurality of off-site hydrogen stations in combination with identification information of the hydrogen station through the terminal in the hydrogen station over a network for each hydrogen station among the plurality of off-site hydrogen stations;

an inventory calculation unit configured to calculate an inventory of the hydrogen gas at a second individual timing set in advance to the hydrogen station among a plurality of second individual timings set in advance to the plurality of off-site hydrogen stations by using an input log data of the plurality of parameters for the each hydrogen station;

a sorting unit configured to input the inventory of the hydrogen gas in the hydrogen station in which the second individual timing is included in a time period for each time period set in advance, and configured to sort a plurality of identification information of the plurality of off-site hydrogen stations in the order of less inventory at the time period for each time period; and an output unit configured to output data of a plurality of sorted identification information of the plurality of off-site hydrogen stations and the inventory of each of the plurality of off-site hydrogen stations for each time period.

According to further another aspect of the present invention, a hydrogen gas inventory acquisition system includes:

a plurality of client terminals disposed in a plurality of off-site hydrogen stations which supply a hydrogen gas to a fuel cell vehicle (FCV), at least one client terminal of the plurality of client terminals being disposed in each of the plurality of off-site hydrogen stations, the plurality of client terminals each being configured to sample a plurality of parameters from data of the plurality of parameters measured by a plurality of meters disposed in a hydrogen station of the plurality of off-site hydrogen stations at a first individual timing set to the hydrogen station among a plurality of first individual timings each being set in advance to a different one of the plurality of off-site hydrogen stations, the plurality of client terminals each being configured to create log data of a plurality of parameters sampled, and the plurality of client terminals each being configured to be connectable to a network;

a data input unit disposed in a data center, and configured to input the log data of the plurality of parameters sampled from the plurality of meters at the first individual timing in each of the plurality of off-site hydrogen stations in combination with identification information of a hydrogen station from the plurality of client terminals over a network;

an inventory calculation unit disposed in the data center, and configured to calculate an inventory of a hydrogen gas at a second individual timing set in advance to the hydrogen station among a plurality of second individual timings each being set in advance to a different one of the plurality of off-site hydrogen stations by using an input log data of the plurality of parameters for each hydrogen station;

a sorting unit disposed in the data center, and configured to input the inventory of the hydrogen gas in the hydrogen station in which the second individual timing is included at a time period for each time period set in advance and to sort a plurality of identification information of the plurality of off-site hydrogen stations in the order of less inventory at the time period for the each time period; and a server device configured to input data of a plurality of sorted identification information of the plurality of off-site hydrogen stations and the inventory of each of the plurality of off-site hydrogen stations for the each time period from the data center over the network, and to output the plurality of sorted identification information of the plurality of off-site hydrogen stations in association with the inventory for the each time period.

Advantageous Effects of Invention

According to the aspect of the invention, it is possible to acquire the inventory of the hydrogen gas in each off-site ST with high accuracy.

BRIEF DESCRIPTION OF THE DRAWINGS

FIG. 6 is a view illustrating an example of log data in Embodiment 1;

FIG. 7 is a view illustrating another example of the log data in Embodiment 1;

FIG. 8 is a view illustrating still another example of the log data in Embodiment 1;

FIG. 9 is a view illustrating an example of sorting data in Embodiment 1;

FIG. 10 is a view illustrating an example of inventory-per-area data in Embodiment 1;

FIG. 14 is a view illustrating an example of sorting data in Embodiment 2; and

FIG. 15 is a view illustrating an example of sorting data in Embodiment 3.

DESCRIPTION OF EMBODIMENTS

Embodiment 1

Figure 1:
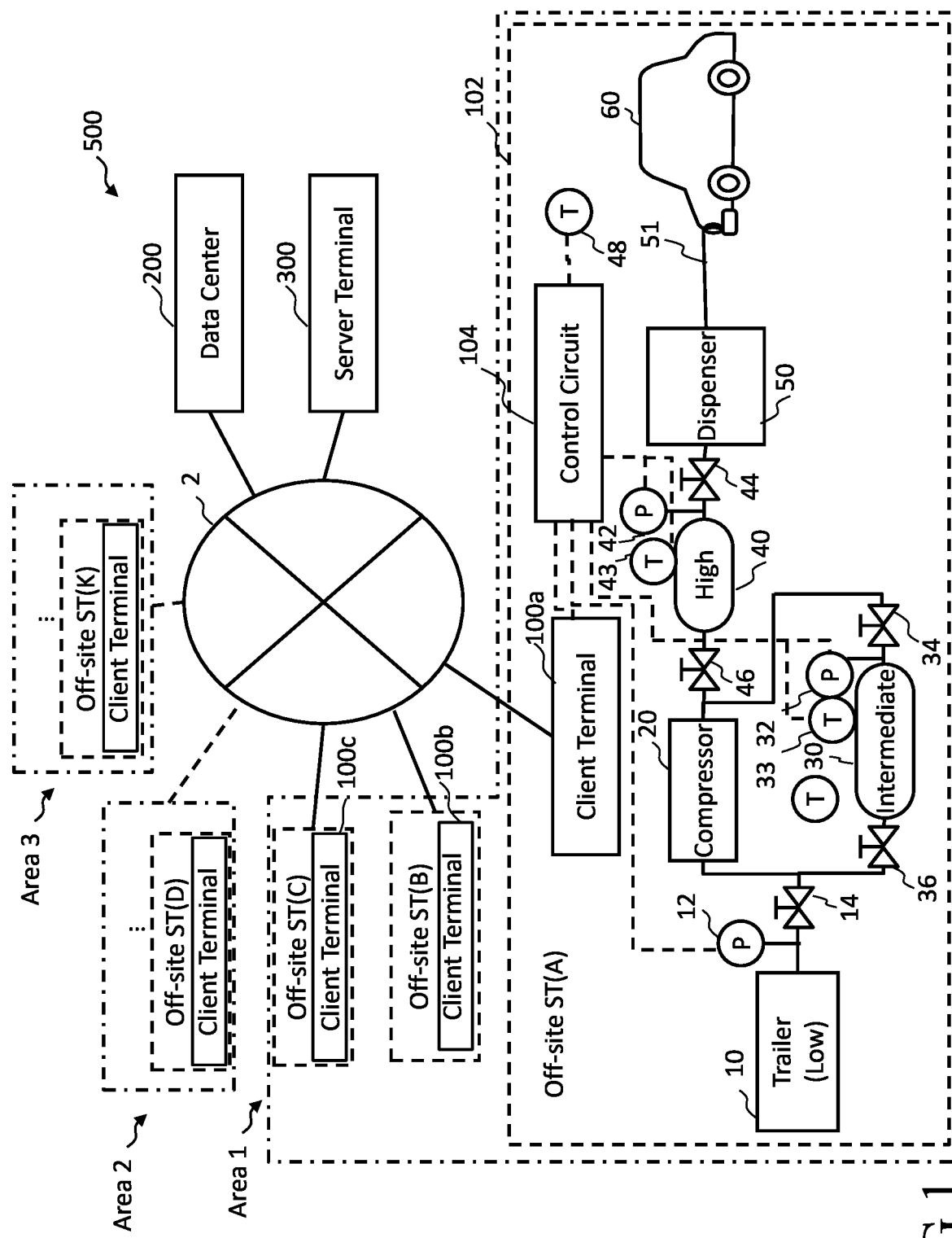
FIG. 1 is an example of a configuration diagram illustrating a configuration of a hydrogen gas inventory acquisition system in Embodiment 1.

FIG. 1 is an example of a configuration diagram illustrating a configuration of a hydrogen gas inventory acquisition system in Embodiment 1. In FIG. 1, a hydrogen gas inventory acquisition system 500 includes a plurality of client terminals 100a, 100b, 100c, 100d, . . . , 100k, . . . (hereinafter, the plurality of client terminals may be collectively referred to as "client terminals 100"), a data center 200, and a server terminal 300. Each of the client terminals 100, the data center 200, and the server terminal 300 are connected to each other in a communication possible manner over a network 2. As the network 2, the Internet can be exemplified, but there is no limitation thereto. For example, a telephone line network, or a network in which the content used by a dedicated line network of this system or the like is limited are also possible.

At least one of the client terminals 100 is disposed in each off-site hydrogen station 102 (hereinafter, may be referred to as "off-site ST") that supplies a hydrogen gas to a fuel cell vehicle (FCV). In this embodiment, at least one client terminal is disposed in each off-site ST, but a plurality of the off-site STs may be managed by one client terminal. In addition, in this embodiment, at least one site of the hydrogen station 102 is disposed for every group (for example, an area). In addition, each of the hydrogen stations 102 pertains to any one group. In this embodiment, the group is noted as an area, but the organization of the group is not limited thereto. In a case where the group is set as an area, for example, in Japan, the group may be divided into a Hokkaido area group, a Tohoku area group, a Kanto area group, a Koshinetsu area group, a Tokai area group, a Hokuriku area group, a West Japan area group, a Kyushu area group, and an Okinawa area group, or may be divided into areas for every delivery area based on a hydrogen production base. Note that, the example in FIG. 1 illustrates a case where three off-site STs including an off-site ST(A), an off-site ST(B), and an off-site ST(C) are disposed as Area 1, at least one including an off-site ST(D) is disposed as Area 2, and at least one including an off-site ST(K) is disposed as Area 3.

The client terminal 100, a trailer 10, a compressor 20, an intermediate accumulator (unloading accumulator) 30, a high-pressure accumulator 40, a dispenser 50, and a control circuit 104 that controls respective facilities in the hydrogen station 102 are disposed in the hydrogen station 102. The trailer 10 includes an accumulator in which a hydrogen gas produced in a hydrogen production base (a hydrogen shipping center, an on-site hydrogen station, or the like) is accumulated at a low pressure (for example, 20 MPa) state. The trailer 10 is conveyed from the hydrogen production base by a tractor, and is disposed in the hydrogen station 102. The trailer 10 disposed in this manner is pipe-connected to the compressor 20 inside the hydrogen station 102 or the like. The compressor 20 compresses the hydrogen gas to a predetermined pressure (for example, 45 MPa or 82 MPa) under control by the control circuit 104. In the intermediate accumulator 30, an intermediate-pressure (for example, 45 MPa) hydrogen gas that is supplied from the trailer 10 and is compressed by the compressor 20 is accumulated. In the high-pressure accumulator 40, a high-pressure (for example, 82 MPa) hydrogen gas that is supplied from the trailer 10 or the intermediate accumulator 30 and is compressed by the compressor 20 is accumulated. In the example illustrated in FIG. 1, the high-pressure accumulator 40 of one stage is shown, but there is no limitation thereto. The high-pressure accumulator 40 is preferably multi-stage accumulators by a plurality of high-pressure accumulators from the viewpoint of rapid filling. As the multi-stage accumulator, for example, the following three-stage accumulator can be used. Specifically, the three-stage accumulator includes a high-pressure accumulator operating as a first bank in which a use lower limit pressure is low, a high-pressure accumulator operating as a second bank in which the use lower limit pressure is intermediate, and a high-pressure accumulator operating as a third band in which the use lower limit pressure is high. The respective accumulators used as the first bank to the third banks may be substituted with each other as necessary. The dispenser 50 supplies a hydrogen gas from the high-pressure accumulator 40 to an FCV 60 (fills the FCV 60 with the hydrogen gas).

In addition, in FIG. 1, a suction side of the compressor 20 is pipe-connected to an ejection side of the trailer 10 through a valve 14. In addition, the suction side of the compressor 20 is pipe-connected to a gas inlet of the intermediate accumulator 30 through a valve 36. In addition, an ejection side of the compressor 20 is pipe-connected to a gas outlet of the intermediate accumulator 30 through a valve 34. In addition, the ejection side of the compressor 20 is pipe-connected to a gas inlet of the high-pressure accumulator 40 through a valve 46. In addition, a gas outlet of the high-pressure accumulator 40 is pipe-connected to the dispenser 50 through a valve 44. Opening/closing of the respective valves is controlled by the control circuit 104.

In addition, an ejection pressure of the trailer 10 is measured by a pressure gauge 12. In addition, a pressure inside the intermediate accumulator 30 is measured by a pressure gauge 32. A pressure inside the high-pressure accumulator 40 is measured by a pressure gauge 42. In a case where the high-pressure accumulator 40 is constituted by the multi-stage accumulators, a pressure gauge that measures a pressure inside each stage of accumulator, a valve that opens or closes an inlet, and a valve that opens or closes an outlet are respectively disposed. In addition, a temperature of the intermediate accumulator 30 is measured by a thermometer 33. A temperature of the high-pressure accumulator 40 is measured by a thermometer 43. In addition, an ambient temperature in a site of the hydrogen station 102 is measured by a thermometer 48. The pressure gauges 12, 32, and 42, and the thermometers 33, 43, and 48, and the control circuit 104 are connected in a wired manner or in a wireless manner such as WiFi. Pressure data and temperature data measured in the pressure gauges 12, 32, and 42, and the thermometers 33, 43, and 48 at a predetermined sampling cycle (for example, approximately 10 ms to several seconds) are output to the control circuit 104.

In addition, a flow rate adjustment valve, a flowmeter, a cooler (pre-cooler), a pressure gauge, and the like (not illustrated) are disposed in the dispenser 50. With regard to a hydrogen gas supplied from the high-pressure accumulator 40 or the compressor 20, a flow rate (filling amount) is measured by the flowmeter, and the flow rate is adjusted by the flow rate adjustment valve. In addition, the hydrogen gas is cooled to a predetermined temperature (for example, −40° C.) by the cooler. The dispenser 50 fills a fuel tank (not illustrated) mounted in the FCV 60 with the cooled hydrogen gas, for example, by using a difference pressure. In addition, an output pressure of the dispenser 50 of the hydrogen gas to be filled into the FCV 60 from the dispenser 50 is measured by the pressure gauge. In addition, a control circuit is disposed inside the dispenser 50 or in the vicinity thereof, and is configured to perform communication with an in-vehicle device inside the FCV 60 arrived at the hydrogen station 102. For example, the control circuit is configured to perform radio communication by using infrared rays.

In the FCV 60, the hydrogen gas as fuel supplied from the dispenser 50 through a nozzle 51 is injected into a fuel tank through a fuel passage from a receiving port (receptacle). A pressure and a temperature inside the fuel tank are measured by a pressure gauge and a thermometer (not illustrated) provided inside the fuel tank or in the fuel passage.

The hydrogen gas accumulated in the high-pressure accumulator 40 is cooled down by a cooler inside the dispenser 50, and is supplied from the dispenser 50 to the FCV 60 arrived at the hydrogen station 102. Note that, in the difference pressure filling, in a case where it is determined that hydrogen filling into the FCV 60 cannot be sufficiently performed, the compressor 20 may directly supply a hydrogen gas to the FCV 60 through the dispenser 50 while compressing the hydrogen gas supplied at a low pressure under control by the control circuit 104.

Figure 2:
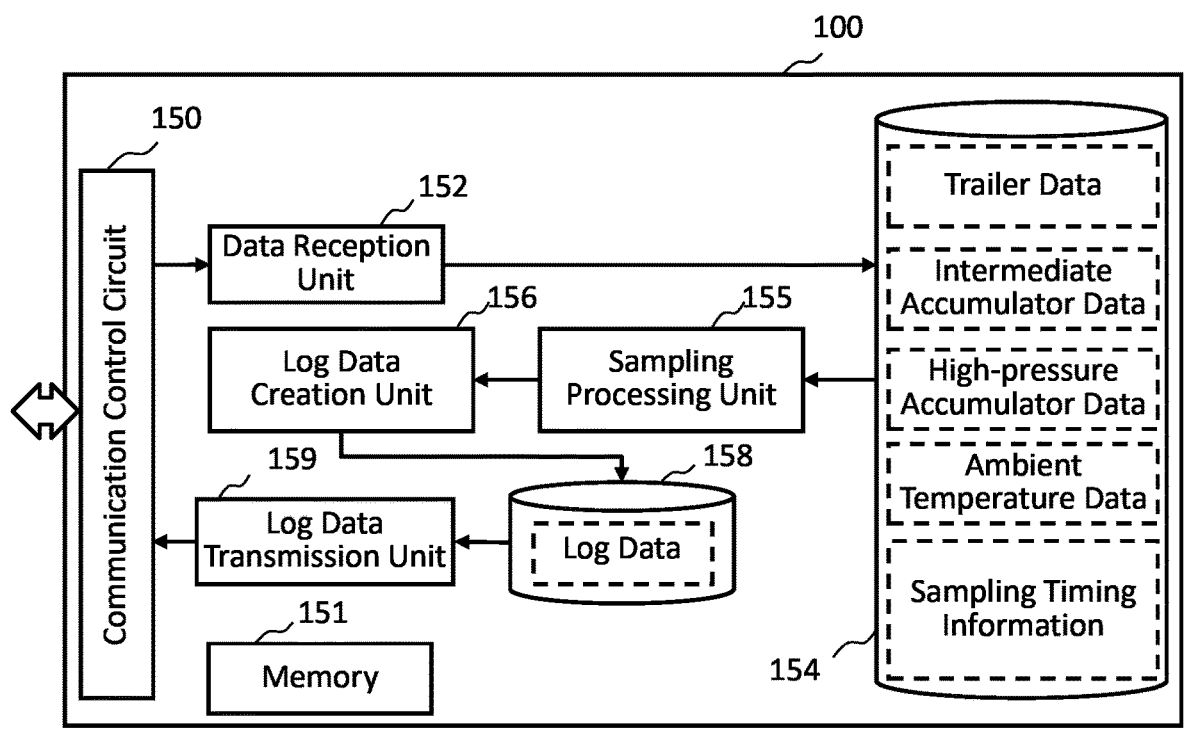
FIG. 2 is a configuration diagram illustrating an example of an internal configuration of a client terminal in Embodiment 1.

FIG. 2 is a configuration diagram illustrating an example of an internal configuration of a client terminal in Embodiment 1. In FIG. 2, a communication control circuit 150, a memory 151, a data reception unit 152, a sampling processing unit 155, a log data creation unit 156, a log data transmission unit 159, and storage devices 154 and 158 such a magnetic disk device are disposed in the client terminal 100 of each of the hydrogen stations 102. Each part such as the data reception unit 152, the sampling processing unit 155, the log data creation unit 156, and the log data transmission unit 159 includes a processing circuit, and an electric circuit, a computer, a processor, a circuit substrate, a semiconductor device, or the like is included in the processing circuit. For example, as the processing circuit, a central processing unit (CPU), a field-programmable gate array (FPGA), or an application specific integrated circuit (ASIC) may be used. In addition, each part may use a common processing circuit (the same processing circuit), or may use a different processing circuit (individual processing circuit). Input data or a calculated result necessary for the data reception unit 152, the sampling processing unit 155, the log data creation unit 156, and the log data transmission unit 159 is stored in the memory 151 each time. In addition, the client terminal 100 and the control circuit 104 of each of the hydrogen stations 102 are connected to communicate with each other in a wired manner or a wireless manner such as WiFi, but the radio connection is preferable from the viewpoint of portability of the client terminal 100.

Individual sampling timing is set in the client terminal 100 in each of the hydrogen stations 102. Measurement information (for example, a pressure or a temperature) is measured in a predetermined sampling cycle by each pressure gauge and each thermometer inside each of the hydrogen stations 102. The client terminal 100 transmits measurement information measured by the pressure gauge and the thermometer at the individual sampling timing to the data center 200. For example, the individual sampling timing is input from the outside of the client terminal 100 and is stored in the storage device 154.

Figure 3:
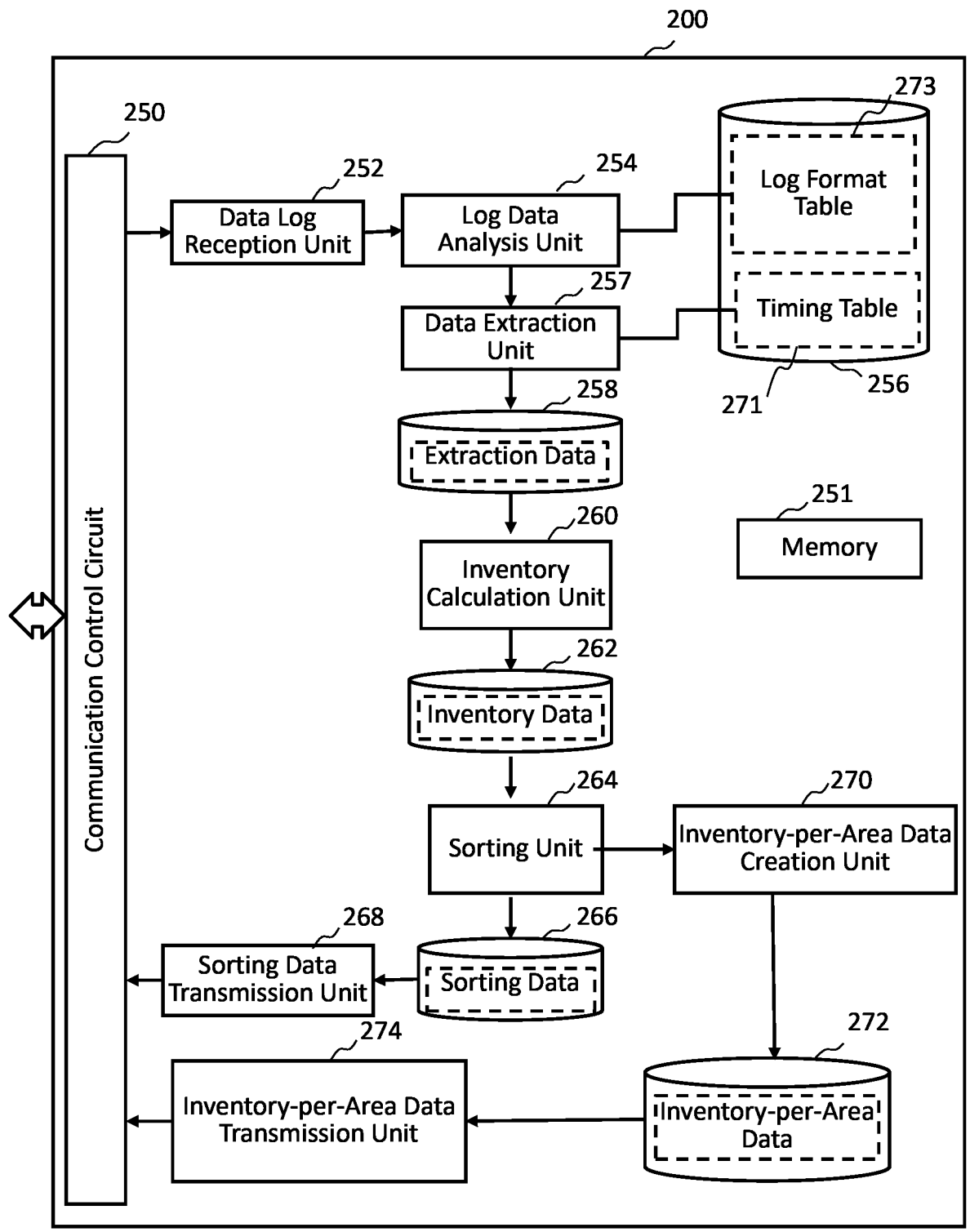
FIG. 3 is a configuration diagram illustrating an example of an internal configuration of a data center in Embodiment 1.

FIG. 3 is a configuration diagram illustrating an example of an internal configuration of the data center in Embodiment 1. In FIG. 3, a communication control circuit 250, a memory 251, a data log reception unit 252, a log data analysis unit 254, a data extraction unit 257, an inventory calculation unit 260, a sorting unit 264, a sorting data transmission unit 268, an inventory-per-area data creation unit 270, an inventory-per-area data transmission unit 274, and storage devices 256, 258, 262, 266, and 272 such as a magnetic disk device are disposed in the data center 200. Each part such as the data log reception unit 252, the log data analysis unit 254, the data extraction unit 257, the inventory calculation unit 260, the sorting unit 264, the sorting data transmission unit 268, the inventory-per-area data creation unit 270, and the inventory-per-area data transmission unit 274 includes a processing circuit, and an electric circuit, a computer, a processor, a circuit substrate, a semiconductor device, or the like is included in the processing circuit. In addition, each part may use a common processing circuit (the same processing circuit). Alternatively, each part may use a different processing circuit (individual processing circuit). For example, as the processing circuit, a central processing unit (CPU), a field-programmable gate array (FPGA), or an application specific integrated circuit (ASIC) may be used. Input data or a calculated result necessary for the data log reception unit 252, the log data analysis unit 254, the data extraction unit 257, the inventory calculation unit 260, the sorting unit 264, the sorting data transmission unit 268, the inventory-per-area data creation unit 270, and the inventory-per-area data transmission unit 274 is stored in the memory 251 each time.

In addition, as to be described later, log data created in a format different for every hydrogen station 102 is transmitted from the client terminal 100 of each of the hydrogen stations 102 to the data center 200. Accordingly, a log format table 273 representing a correlation between each of the hydrogen stations 102 and the format of the log data created in each of the hydrogen stations 102 is stored in the storage device 256. In addition, a plurality of individual calculation timings as a timing at which an inventory is calculated are set in each of the hydrogen station 102. Accordingly, a timing table 271 representing a correlation between each of the hydrogen stations 102 and a calculation timing and a calculation method of the inventory in each of the hydrogen stations 102 is stored in the storage device 256.

In each of the hydrogen stations 102, it is confirmed whether or not a hydrogen gas having a predetermined pressure (for example, 82 MPa) is accumulated in the high-pressure accumulator 40 before business hours or immediately after initiation of business. In a case where accumulation is not sufficient, under control by the control circuit 104, the compressor 20 is driven, and a high-pressure hydrogen gas is accumulated in the high-pressure accumulator 40 until reaching a predetermined pressure (for example, 82 MPa) by opening the valve 46 in a state in which the valves 34 and 44 are closed. At this time, typically, under control by the control circuit 104, a hydrogen gas accumulated in the trailer 10 is supplied to the suction port of the compressor 20 by opening the valve 14 in a state in which the valve 36 is closed, and the hydrogen gas is compressed to recover the pressure of the high-pressure accumulator 40. In a case where the hydrogen gas is deficient even in this case, the hydrogen gas accumulated in the intermediate accumulator 30 may be supplied to the suction port of the compressor 20 by opening the valve 36 in a state in which the valve 14 is closed, and the hydrogen gas may be compressed to recover the pressure of the high-pressure accumulator 40. According to this, the FCV 60 is ready to be accepted. As a method other than the above-described control, the pressure of the high-pressure accumulator 40 may be recovered by mainly using the intermediate accumulator 30. Under control by the control circuit 104, the hydrogen gas accumulated in the intermediate accumulator 30 may be supplied to the suction port of the compressor 20 by opening the valve 36 in a state in which the valve 14 is closed, and the hydrogen gas may be compressed to recover the pressure of the high-pressure accumulator 40. In a case where the hydrogen gas is deficient even in this case, under control by the control circuit 104, the hydrogen gas accumulated in the trailer 10 may be supplied to the suction port of the compressor 20 by opening the valve 14 in a state in which the valve 36 is closed, and the hydrogen gas may be compressed to recover the pressure of the high-pressure accumulator 40. According to this, the FCV 60 is ready to be accepted. The pressure of the intermediate accumulator 30 decreases due to recovery of the pressure of the high-pressure accumulator 40. In this case, under control by the control circuit 104, the valves 14 and 34 are opened in a state in which the valves 36 and 46 are closed, the hydrogen gas accumulated in the accumulator of the trailer 10 is compressed by the compressor 20 and the pressure is recovered until the intermediate accumulator 30 reaches a predetermined pressure (for example, 45 MPa). The operation of the compressor 20 is stopped when the intermediate accumulator 30 and the high-pressure accumulator 40 reaches each defined pressure. In addition, in a case where the pressure of the intermediate accumulator 30 or the high-pressure accumulator 40 decreases to be equal to or less than a reference value, the operation of the compressor is initiated, and when the pressure of the intermediate accumulator 30 and the high-pressure accumulator 40 reaches each defined pressure, the operation of the compressor is stopped. The operation is repeated. In a state in which the compressor 20 does not operate, typically, the valves 14, 36, 34, and 46 are controlled to be closed.

When the FCV 60 arrives at the hydrogen station 102, a worker of the hydrogen station 102 or a user of the FCV 60 connects (fit) the nozzle 51 of the dispenser 50 to a receiving port (receptacle) of a fuel tank of the FCV 60 and fixes the nozzle 51. When the FCV 60 arrives at the hydrogen station 102, and the nozzle 51 of the dispenser 50 is connected and fixed to the receiving port (receptacle) of the fuel tank of the FCV 60 by the user or the worker of the hydrogen station 102, communication between an in-vehicle device of the FCV 60 and a control circuit (relay) of the dispenser 50 is established.

Next, when the communication between the in-vehicle device of the FCV 60 and the control circuit of the dispenser 50 is established, FCV information such as a current pressure and a current temperature of the fuel tank of the FCV 60, and the volume of the fuel tank is output (transmitted) from the in-vehicle device of the FCV 60 in real time. The FCV information is transmitted to the control circuit 104 through the control circuit of the dispenser 50. The control circuit 104 receives the FCV information. The control circuit 104 acquires the FCV information at all times or at a predetermined sampling interval (for example, 10 ms to several seconds) while the communication between the in-vehicle device of the FCV 60 and the control circuit of the dispenser 50 is established.

In the control circuit 104, a final pressure $P_F$ corresponding to a pressure $P_a$, a temperature $T_i$, and the volume V of the fuel tank, and an ambient temperature T which are received at an initial stage of reception is calculated and predicted.

Next, the control circuit 104 creates a filling control flow plan for supplying a hydrogen gas to the fuel tank of the FCV 60 (for filling the fuel tank with the hydrogen gas) by using a difference pressure with the high-pressure accumulator 40. When the high-pressure accumulator 40 is constituted by the multi-stage accumulators, a filling control flow plan including selection of each accumulator of the multi-stage accumulator and a switching timing of the multi-stage accumulator in order for the pressure of the fuel tank to reach the final pressure $P_F$ is created. In the case of carrying out the filling control flow plan, the control circuit 104 sets a pressure rise rate in correspondence with the ambient temperature of the hydrogen station 102, and calculates a filling rate corresponding to the pressure rise rate. In addition, in order to suppress a rapid temperature rise, the control circuit 104 calculates a filling rate corresponding to a pressure rise rate determined in correspondence with the ambient temperature of the hydrogen station 102 in addition to the temperature of the fuel tank of the FCV 60 in the middle of filling. The filling control flow is planned under these conditions, and time $T_3$ (arrival time) until reaching the final pressure $P_F$ from initiation of filling is obtained. Note that, in this embodiment, the filling rate is determined by using the ambient temperature of the hydrogen station 102, but the filling rate may be determined by using a hydrogen temperature that is directly measured, or the filling rate may be determined by using both the ambient temperature and the hydrogen temperature.

Next, the valve 44 is controlled to be opened, and the fuel tank mounted in the FCV 60 is filled with the hydrogen gas from the high-pressure accumulator 40 through the dispenser 50 (meter) by using difference pressure filling in accordance with the created filling control flow plan. In the case of using the multi-stage accumulators as the high-pressure accumulator 40, a specific operation is as follows. When using the multi-stage accumulator, a filling time can be shortened.

Figure 4:
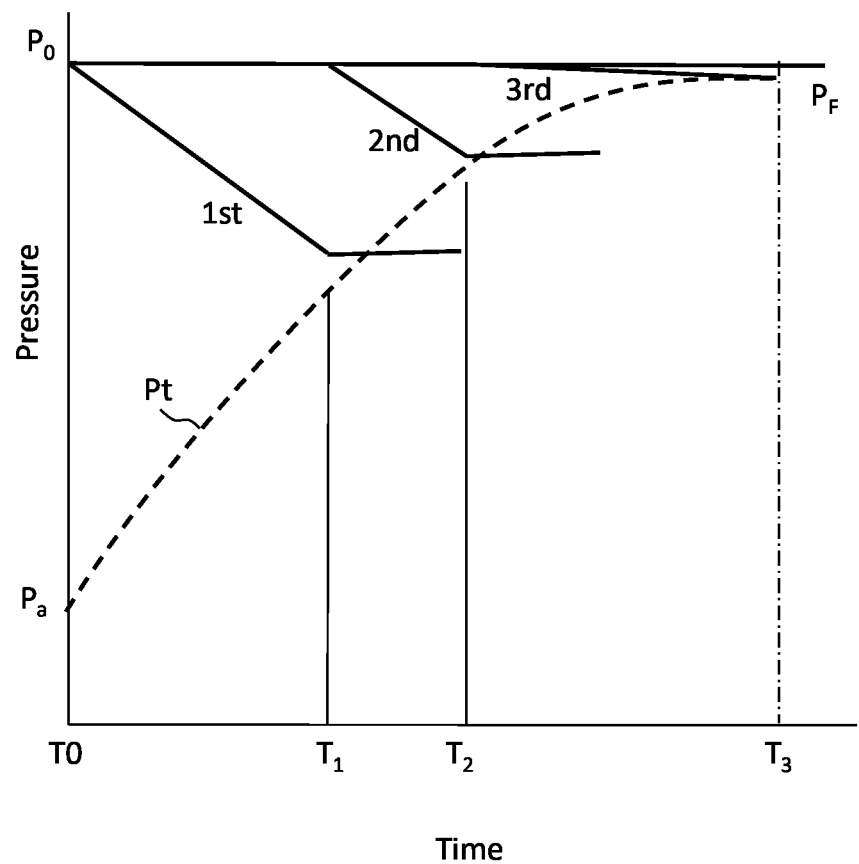
FIG. 4 is a view for describing a filling method in the case of performing difference-pressure filling with a hydrogen fuel by using multi-stage accumulators in Embodiment 1.

FIG. 4 is a view for describing a filling method in the case of performing the difference pressure filling with the hydrogen fuel by using the multi-stage accumulators. In FIG. 4, the vertical axis represents a pressure and the horizontal axis represents time. In the case of performing the difference pressure filling with the hydrogen fuel for the FCV 60, typically, each accumulator of the multi-stage accumulator is accumulated to the same pressure $P_0$ (for example, 82 MPa) in advance. On the other hand, the fuel tank of the FCV 60 arrived at the hydrogen station 102 is at a pressure $P_a$. Description will be given of the case of initiating filling to the fuel tank of the FCV 60 from the above-described state.

First, filling of the fuel tank is initiated from an accumulator that becomes a first bank in the multi-stage accumulators. According to this, the hydrogen fuel is supplied to the fuel tank from the accumulator as the first bank. The hydrogen fuel accumulated in the accumulator moves to the fuel tank side at an adjusted filling rate due to a difference pressure between the accumulator and the fuel tank, and the pressure of the fuel tank gradually rises as indicated by a dotted line Pt. According to this, the pressure of the accumulator as the first bank gradually decreases (graph indicated by "1st"). In addition, at the time of reaching a use lower limit pressure of the first bank after passage of time T1 from initiation of filling, the accumulator as the first bank is switched to an accumulator as a second bank. According to this, since a residual pressure is greater (a difference pressure with the fuel tank is larger) in the accumulator as the second bank in comparison to the accumulator as the first bank used until reaching the time $T_1$, a filling rate can be maintained to a fast state.

In addition, the hydrogen fuel accumulated in the accumulator that is the second bank is moved to the fuel tank side at an adjusted filling rate due to a difference pressure between the accumulator as the second bank and the fuel tank, and the pressure of the fuel tank further rises as indicated by the dotted line Pt. According to this, the pressure of the accumulator as the second bank gradually decreases (graph indicated by "2nd"). In addition, at the time of reaching a use lower limit pressure of the second bank after passage of time T2 from initiation of filling, an accumulator that is used is switched from the accumulator as the second bank to an accumulator as a third bank. According to this, since a residual pressure is greater (a difference pressure with the fuel tank is larger) in the accumulator as the third bank in comparison to the accumulator as the second bank used until reaching the time T2, a filling rate can be maintained to a fast state.

In addition, the hydrogen fuel accumulated in the accumulator as the third bank due to the difference pressure between the accumulator as the third bank and the fuel tank is moved to the fuel tank side at an adjusted filling rate, and the pressure of the fuel tank further rises as indicated by the dotted line $P_t$. According to this, the pressure of the accumulator as the third bank gradually decreases (graph indicated by "3rd"). In addition, filling is performed by the accumulator as the third bank until the pressure of the fuel tank reaching the final pressure $P_F$ (for example, 65 to 81 MPa).

As described above, the fuel tank is filled with the hydrogen gas sequentially from the first bank. The above-described example illustrates a case where the pressure $P_1$ of the fuel tank of the FCV 60 arrived at the hydrogen station 102 is a pressure sufficiently lower than the use lower limit pressure of the accumulator as the first bank which is set in advance. As an example, the case of a sufficiently low state, for example, ½ or less of full filling (full tank) is illustrated. In this case, in order to increase the pressure of the fuel tank of the FCV 60 to the final pressure $P_F$ through rapid filling, for example, three accumulators are preferable. The FCV 60 arrived at the hydrogen station 102 is not limited to a case where the pressure of the fuel tank is sufficiently low. In a case where the pressure of the fuel tank is higher than, for example, ½ of the full filling, for example, two accumulators may be sufficient in some cases. In addition, in a case where the pressure of the fuel tank is high, for example, one accumulator may be sufficient in some cases.

When filling of the fuel tank of the FCV 60 with the hydrogen gas (supplying of the hydrogen gas) is terminated, the nozzle 51 of the dispenser 50 is taken out from the receiving port (receptacle) of the fuel tank of the FCV 60, and a user pays a fee corresponding to a metered filling amount and leaves the hydrogen station 102.

In a case where the hydrogen filling to the FCV 60 is performed by the high-pressure accumulator 40, and the pressure inside the high-pressure accumulator 40 decreases, and/or in a case where a filling amount to the FCV 60 is deficient in hydrogen gas supply from the high-pressure accumulator 40, under control by the control circuit 104, an operation of the compressor 20 is initiated, and for example, the hydrogen gas accumulated in the intermediate accumulator 30 is compressed to recover the high-pressure accumulator 40 until reaching a predetermined pressure (for example, 82 MPa).

In each of the hydrogen stations 102, the above-described operations are repeated during business hours. According to this, the inventory of the hydrogen gas in each of the hydrogen stations 102 varies from moment to moment. In each of the hydrogen stations 102, the hydrogen gas is accumulated in the trailer 10, the intermediate accumulator 30, and the high-pressure accumulator 40. Accordingly, the inventory of the hydrogen gas in each of the hydrogen stations 102 becomes a total amount (kg) of the hydrogen gas accumulated in the accumulators. Each accumulation amount (weight of the hydrogen gas) can be obtained by a PVT method (volume method) by using capacity (a volume) V of an accumulation container, a pressure P, and a temperature T. In the related art, in each off-site ST, a worker acquires information of facilities such as the accumulator disposed in the off-site ST, and performs manual recording of the information or the like. Specifically, the worker reads out information (for example, a pressure and a temperature) from respective meters (for example, a pressure gauge and a thermometer) indicating a state of each facility, writes the information (data) in a data sheet, and transmits the information to a management organization at the heat office. Accordingly, a reading error due to the worker occurs. Particularly, in the case of reading a numerical value from an analog meter, a large error may occur. In addition, each meter provided in each of the off-site STs may be different, and information reading timing from the meter may also be different in some cases. Accordingly, there is a problem that it is difficult to accurately grasp the inventory of the hydrogen gas in each off-site ST from the obtained data (information read out from the meters). As a result, it should rely on experience as to when and how much hydrogen gas should be transported to which off-site ST. In this regard, in Embodiment 1, in order to grasp the inventory of the hydrogen gas in each off-site ST with high accuracy, at an individual sampling timing set in each of the hydrogen stations 102, for example, the pressure P and the temperature T of the accumulator of the trailer 10, the intermediate accumulator 30, and the high-pressure accumulator 40 are automatically sampled, and log data is created and is automatically transmitted to the data center 200. In addition, in the data center 200, the inventory is calculated at the individual calculation timing of each of the hydrogen stations 102 which is suitable for the log data.

Figure 5:
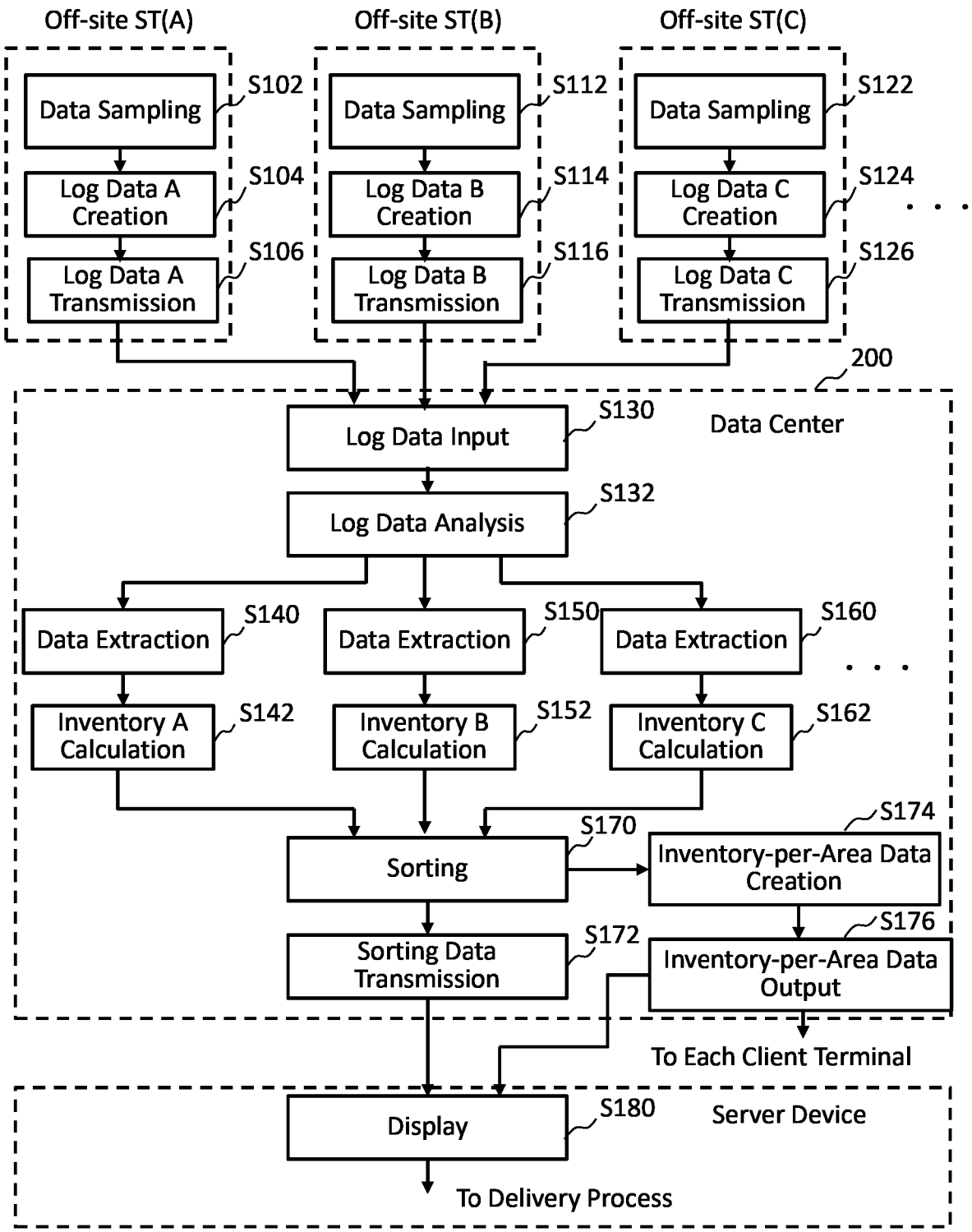
FIG. 5 is an example of a flowchart illustrating main processes in a hydrogen gas inventory acquisition method in Embodiment 1.

FIG. 5 is an example of a flow chart illustrating main processes in a hydrogen gas inventory acquisition method in Embodiment 1. In the example illustrated in FIG. 5, among processes performed in the hydrogen stations 102, processes performed in three off-site ST(A), off-site ST(B), and off-site ST(C) are illustrated, but the same processes are performed in the other hydrogen stations 102. In FIG. 5, the hydrogen gas inventory acquisition method in Embodiment 1 carries out a series of processes such as a data sampling process (S102), a log data A creation process (S104), and a log data A transmission process (S106) which are performed in the off-site ST(A), a data sampling process (S112), a log data B creation process (S114), and a log data B transmission process (S116) which are performed in the off-site ST(B), a data sampling process (S122), a log data C creation process (S124), and a log data C transmission process (S126) which are performed in the off-site ST(C), a log data input process (S130), a log data analysis process (S132), a data extraction process (S140), an inventory A calculation process (S142), a data extraction process (S150), an inventory B calculation process (S152), a data extraction process (S160), an inventory C calculation process (S162), a sorting process (S170), a sorting data transmission process (S172), an inventory-per-area data creation process (S174), an inventory-per-area data output process (S176), and a display process (S180). The data sampling process may be referred to as an information acquisition process.

The log data input process (S130), the log data analysis process (S132), the data extraction process (S140), the inventory A calculation process (S142), the data extraction process (S150), the inventory B calculation process (S152), the data extraction process (S160), the inventory C calculation process (S162), the sorting process (S170), the sorting data transmission process (S172), the inventory-per-area data creation process (S174), and the inventory-per-area data output process (S176) are performed in the data center 200. In the example illustrated in FIG. 5, the three off-site STs including off-site ST(A), off-site ST(B), and off-site ST(C) are illustrated, and thus description is given of a case where the data extraction process (S140) and the inventory A calculation process (S142) for the off-site ST(A) are performed, the data extraction process (S150) and the inventory B calculation process (S152) for the off-site ST(B) is performed, and the data extraction process (S160) and the inventory C calculation process (S162) for the off-site ST(C) are performed. A set of the data extraction process and the inventory calculation process exists in a number corresponding to the number of the hydrogen stations 102. In addition, the display process (S180) is performed in the server terminal 300.

First, in the client terminal 100 inside each of the hydrogen stations 102, the data reception unit 152 receives pressure data measured by each of the pressure gauges 12, 32, and 42 which measure a pressure at a predetermined sampling cycle, and temperature data measured by the thermometers 33, 43, and 48 from the control circuit 104 through the communication control circuit 150, and stores the pressure data and the temperature data in the storage device 154 in combination with data acquisition time. According to this, the storage device 154 stores trailer data that is pressure data relating to the trailer 10, intermediate accumulator data that is pressure data and temperature data relating to the intermediate accumulator 30, high-pressure accumulator data that is pressure data and temperature data relating to the high-pressure accumulator 40, and ambient temperature data that is ambient temperature data in a site of the hydrogen station 102. In this embodiment, the ambient temperature in a site of the hydrogen station 102 is used as a substitute for the temperature of the accumulator of the trailer 10, but in a case where the temperature of the accumulator of the trailer 10 can be directly acquired, the temperature of the accumulator instead of the ambient temperature may be stored in the storage device 154.

As the data sampling process (S102), the sampling processing unit 155 in the client terminal 100a acquires parameter data (for example, a pressure and a temperature) through sampling from respective meters (for example, a pressure gauge and a thermometer) disposed in the hydrogen station 102 at an individual sampling timing set in advance. Specifically, the sampling processing unit 155 performs sampling of each pressure, each accumulator temperature, and an ambient temperature as information at an individual sampling timing set in advance to the client terminal 100a for the off-site ST(A) with reference to the trailer data, the intermediate accumulator data, the high-pressure accumulator data, and the ambient temperature data in the off-site ST(A) which are stored in the storage device 154. For example, in the off-site ST(A), as an individual sampling timing set in advance to the client terminal 100a in the off-site ST(A), a predetermined sampling cycle that continues for a period from an operation initiation time to an operation stoppage time of the compressor 20 is used. As the predetermined sampling cycle, for example, a cycle of several tens msec to several sec is exemplified, but a cycle of 0.1 sec to 2 sec is preferable from the viewpoint of information accuracy and an information processing load.

As the log data A creation process (S104), the log data creation unit 156 in the client terminal 100a creates log data of parameters acquired from the meters in the off-site ST(A). A log data creation timing in the log data creation unit 156 is not particularly limited, but the creation is preferably performed whenever the operation of the compressor 20 is stopped. When the compressor 20 is stopped continuously, or when the compressor 20 is operating, the pressure of the accumulator may not be accurately acquired by the pressure gauge. On the other hand, immediately after the compressor is stopped, the pressure of each accumulator becomes more accurate, and it is preferable that update of the log data in the storage device 158 is performed by adding or overwriting the log data to the past log data.

FIG. 6 is a view illustrating an example of the log data in Embodiment 1. In the example illustrated in FIG. 6, an example of log data A in the off-site ST(A) is illustrated. In the log data A illustrated in FIG. 6, for example, "log data A" is recorded, for example, in a header as a hydrogen station identifier for identifying the hydrogen station 102. In addition to this, for example, a parameter data acquisition time, a pressure P1 of the trailer 10, a pressure P2 and a temperature T2 of the intermediate accumulator 30, a pressure P3 and a temperature T3 of the high-pressure accumulator 40, an ambient temperature T in a site of the off-site ST(A), and ON/OFF identifier of the compressor 20 are recorded in the log data A. The created log data A is stored in the storage device 158.

As the log data A transmission process (S106), the log data transmission unit 159 in the client terminal 100a transmits log data A to the data center 200 through the communication control circuit 150 and the network 2. It is preferable that the log data transmission unit 159 performs transmission, for example, whenever the log data A is updated.

As the data sampling process (S112), the sampling processing unit 155 in the client terminal 100b acquires a plurality of parameters from data of the plurality of parameters measured by a plurality of meters disposed in the hydrogen station 102 at an individual sampling timing (first individual timing) set in advance through sampling. Specifically, the sampling processing unit 155 samples each pressure and an ambient temperature as a plurality of parameters at the individual sampling timing set in advance to the client terminal 100b for the off-site ST(B) with reference to the trailer data, the intermediate accumulator data, the high-pressure accumulator data, and ambient temperature data in the off-site ST(B) which are stored in the storage device 154. For example, in the off-site ST(B), as the individual sampling timing set in advance to the client terminal 100b in the off-site ST(B), a predetermined sampling cycle that continues for a period from initiation time of supply of hydrogen gas from the high-pressure accumulator 40 to the FCV 60 through the meter 50 to termination time of the supply is used. As the predetermined sampling cycle, for example, a cycle (for example, one second) of several tens msec to several sec is preferably used. It is preferable that the sampling processing unit 155 performs data sampling whenever supply of the hydrogen gas to the FCV 60 is terminated.

As the log data B creation process (S114), the log data creation unit 156 in the client terminal 100b creates log data of the plurality of parameters sampled in the off-site ST(B). It is preferable that the log data creation unit 156 creates the log data whenever supply of the hydrogen gas to the FCV 60 is terminated, and performs update of the log data by adding or overwriting the log data to the past log data.

FIG. 7 is a view illustrating another example of the log data in Embodiment 1. In the example illustrated in FIG. 7, an example of the log data in the off-site ST(B) is illustrated. In the log data illustrated in FIG. 7, for example, "log data B" attached with an identifier (B) for identifying the hydrogen station 102 is defined in a header. Subsequently, for example, definition is performed in the order of time, the ambient temperature T, the pressure P2 and the temperature T2 of the intermediate accumulator 30, the pressure P3 and the temperature T3 of the high-pressure accumulator 40, the pressure P1 of the trailer 10, an identifier of filling initiation/termination, and a filling amount Q. The created log data is temporarily stored in the storage device 158. As the filling amount Q, a filling amount metered by the dispenser 50 is defined.

As the log data B transmission process (S116), the log data transmission unit 159 in the client terminal 100b transmits the log data to the data center 200 in combination with the identification information of the hydrogen station 102 through the communication control circuit 150 over the network 2. In the example illustrated in FIG. 7, an identifier (B) for identifying the off-site ST(B) is defined in the header of the log data as the identification information of the hydrogen station 102. For example, it is preferable that the log data transmission unit 159 performs transmission whenever the log data is updated.

As the data sampling process (S122), the sampling processing unit 155 in the client terminal 100c acquires a plurality of parameters from data of the plurality of parameters measured by a plurality of meters disposed in the hydrogen station 102 at an individual sampling timing (first individual timing) set in advance through sampling. Specifically, the sampling processing unit 155 samples each pressure and an ambient temperature as a plurality of parameters at the individual sampling timing set in advance to the client terminal 100c for the off-site ST(C) with reference to trailer data, intermediate accumulator data, high-pressure accumulator data, and ambient temperature data in the off-site ST(C) which are stored in the storage device 154. For example, in the off-site ST(C), as the individual sampling timing set in advance to the client terminal 100c in the off-site ST(C), a predetermined sampling cycle that continues for business hours of the hydrogen station 102 is used. As the predetermined sampling cycle, for example, a cycle (for example, one second) of several tens msec to several sec is preferably used. For example, it is preferable that the sampling processing unit 155 performs data sampling for every 30 minutes to one hour.

As the log data C creation process (S124), the log data creation unit 156 in the client terminal 100c creates log data of a plurality of parameters sampled in the off-site ST(C). For example, it is preferable that the log data creation unit 156 creates the log data for every 30 minutes to one hour, and performs update of the log data by adding or overwriting the log data to the past log data.

FIG. 8 is a view illustrating another example of the log data in Embodiment 1. The example in FIG. 8 illustrates an example of the log data in the off-site ST(C). In the log data illustrated in FIG. 8, for example "log data C" attached with an identifier (C) for identifying the hydrogen station 102 is defined in a header. Subsequently, for example, definition is performed in the order of time, the pressure P1 of the trailer 10, the pressure P2 and the temperature T2 of the intermediate accumulator 30, the number of times of accumulation in the intermediate accumulator, the pressure P3 and the temperature T3 of the high-pressure accumulator 40, and the ambient temperature T. The created log data is temporarily stored in the storage device 158.

As the log data C transmission process (S126), the log data transmission unit 159 in the client terminal 100c transmits the log data to the data center 200 in combination with identification information of the hydrogen station 102 through the communication control circuit 150 over the network 2. In the example illustrated in FIG. 8, the identifier (C) for identifying the off-site ST(C) is defined in the header of the log data as the identification information of the hydrogen station 102. For example, it is preferable that the log data transmission unit 159 performs transmission whenever the log data is updated.

Here, in the above-described example, after the pressure data measured by the pressure gauges 12, 32, and 42 which are measuring a pressure at a predetermined sampling cycle, and the temperature data measured by the thermometers 33, 43, and 48 are received into the client terminal 100 at once, sampling is performed at the individual sampling timing that is set from the entirety of data, but there is no limitation thereto. The data reception unit 152 may receive only data sampled at the individual sampling timing that is set from the pressure gauges 12, 32, and 42, and the thermometers 33, 43, and 48, or from the control circuit 104.

As illustrated in FIG. 6 to FIG. 8, the log data created by the client terminal 100 of each of the hydrogen stations 102 is different in the sampling timing. In addition, a creation format is also different. Note that, it is needless to say that the log data may be created at the same sampling timing and/or in the same format in two or more hydrogen stations 102.

As the log data input process (S130), the data log reception unit 252 (data input unit) in the data center 200 sequentially receives the log data created by the client terminal 100 of each of the hydrogen stations 102 through the communication control circuit 150 over the network 2. For example, a file of the log data A illustrated in FIG. 6 is received from the client terminal 100a of the off-site ST(A). For example, a file of the log data B illustrated in FIG. 7 is received from the client terminal 100b of the off-site ST(B). For example, a file of the log data C illustrated in FIG. 8 is received from the client terminal 100c of the off-site ST(C).

As the log data analysis process (S132), the log data analysis unit 254 in the data center 200 analyzes the received log data with reference to the log format table stored in the storage device 256. A specific operation is as follows. First, the log data analysis unit 254 recognizes an identifier (identification information) of the hydrogen station 102 from the received log data, and specifies the hydrogen station 102. Next, the log data analysis unit 254 acquires a log format for the specified hydrogen station 102 with reference to the log format table. The acquired log format shows which data is defined at which position (address). In addition, the log format includes the volume of each accumulator. For example, the volume of the accumulator of the trailer 10, the volume of the intermediate accumulator 30, and the volume of the high-pressure accumulator 40 can be acquired from the log format. In this manner, when analyzing the log data, even in a case where a plurality of pieces of log data different in a format are mixed in, a format for every log data can be specified, and the meaning of data of each position (address) in each piece of log data can be grasped, and the volume of the accumulator or the like can be acquired.

As the data extraction process (S140), the data extraction unit 257 in the data center 200 extracts data necessary to calculate an inventory of the hydrogen gas in the hydrogen station 102 from information obtained by analyzing the log data by the log data analysis unit 254. Here, data necessary to calculate the inventory of the hydrogen gas in the hydrogen station 102 is extracted from the log data A. A specific operation is as follows. First, the data extraction unit 257 recognizes an identifier (identification information) of the hydrogen station 102 from the received log data and specifies the hydrogen station 102. Next, the data extraction unit 257 acquires individual timing information as a timing at which the inventory for the specified hydrogen station 102 is calculated with reference to the timing table 271 stored in the storage device 256. In the acquired individual timing information, an individual timing (time) as a timing at which the inventory is calculated and data necessary to calculate the inventory are defined. The data extraction unit 257 extracts the data necessary to calculate the inventory of the hydrogen gas at the individual timing from the analysis information in the log data analysis unit 254. The extraction data extracted for every log data is stored in the storage device 258 in association with the identifier of the hydrogen station 102.

For example, in the off-site ST(A), as illustrated in FIG. 6, operation stoppage (OFF) time of the compressor 20 becomes the individual timing (time) at which the inventory is calculated. In addition, the data extraction unit 257 extracts a plurality of pieces of data of a pressure P1 and a volume V1 of the accumulator of the trailer 10, a pressure P2, a temperature T2, and a volume V2 of the intermediate accumulator 30, a pressure P3, a temperature T3, and a volume V3 of the high-pressure accumulator 40, and an ambient temperature T at the operation stoppage (OFF) time of the compressor 20 as extraction data necessary to calculate the inventory of the hydrogen gas at the individual timing on the basis of the log format of the log data A.

As the inventory A calculation process (S142), the inventory calculation unit 260 in the data center 200 calculates the inventory A of the hydrogen gas by using the extraction data stored in the storage device 258. A specific operation is as follows. The inventory calculation unit 260 reads out the extraction data stored in association with the identifier of the off-site ST(A) from the storage device 258. According to this, as the extraction data, a plurality of pieces of data of the pressure P1 of the trailer 10, the pressure P2 and the temperature T2 of the intermediate accumulator 30, and the pressure P3 and the temperature T3 of the high-pressure accumulator 40, and the ambient temperature T at the operation stoppage (OFF) time of the compressor 20 are acquired. In addition, the inventory calculation unit 260 acquires the volume V1 of the accumulator of the trailer 10, the volume V2 of the intermediate accumulator 30, and the volume V3 of the high-pressure accumulator 40 from the log format of the log data A. In addition, the inventory calculation unit 260 calculates the inventory of the hydrogen gas in the off-site ST(A) at the operation stoppage (OFF) time of the compressor 20 by using the extraction data and the volume of each of the accumulation containers. Specifically, the amount of accumulation (the weight of the hydrogen gas) of the accumulator such as the trailer 10, the intermediate accumulator 30, and the high-pressure accumulator 40 can be obtained by the PVT method (volume method) by using the volume V of the accumulator, the pressure P, and the temperature T. Specifically, the density $\rho$ (P, T) of the hydrogen gas in an accumulation container can be calculated from a compression rate peculiar to hydrogen by using the pressure P and the temperature T of the accumulation container such as the trailer 10, the intermediate accumulator 30, and the high-pressure accumulator 40. With regard to the temperature of the intermediate accumulator 30 and the high-pressure accumulator 40, the temperatures T2 and T3 may be used. With regard to the temperature of the accumulator of the trailer 10, the ambient temperature T may be used. The temperature of the accumulator of the trailer 10 may be directly acquired and used instead of the ambient temperature T. The weight (kg) of the hydrogen gas in the accumulation container can be calculated by multiplying the density $\rho$ (P, T) of the hydrogen gas in the accumulation container by the volume V of the accumulation container. In addition, the inventory calculation unit 260 adds the weight W1 (kg) of the hydrogen gas accumulated in the trailer 10 at the operation stoppage (OFF) time of the compressor 20, the weight W2 (kg) of the hydrogen gas accumulated in the intermediate accumulator 30 at that time, and the weight W3 (kg) of the hydrogen gas accumulated in the high-pressure accumulator 40 to calculate the inventory A (kg) of the hydrogen gas in the off-site ST(A) at the operation stoppage (OFF) time of the compressor 20. An error may occur in the pressure P2 of the intermediate accumulator 30 in a state in which the valve 34 is closed. Accordingly, it is preferable to use pressure data measured in a state in which the valve 34 is opened. Similarly, an error may occur in the pressure P3 of the high-pressure accumulator 40 in a state in which the valve 46 is closed. Accordingly, it is preferable to use pressure data measured in a state in which the valve 46 is opened. At the operation stoppage (OFF) time of the compressor 20, the valve 34 or the valve 46 is controlled to an opened state. Accordingly, in the off-site ST(A), since the pressure P2 of the intermediate accumulator 30 and the pressure P3 of the high-pressure accumulator 40 at the operation stoppage (OFF) time of the compressor 20 are used in calculation of the inventory, at least the pressure P2 of the intermediate accumulator 30 or the pressure P3 of the high-pressure accumulator 40 can be measured with high accuracy. The calculated inventory A is stored in the storage device 262.

As the data extraction process (S150), the data extraction unit 257 in the data center 200 extracts data necessary to calculate the inventory of the hydrogen gas in the hydrogen station 102 which becomes the basis of the log data B from the received log data B. A specific operation is similar to the data extraction process (S140). The extracted extraction data is stored in the storage device 258 in association with the identifier of the hydrogen station 102.

For example, in the off-site ST(B), as illustrated in FIG. 7, termination (filling termination) time of supply of the hydrogen gas to the FCV 60 becomes the individual timing (time) at which the inventory is calculated. In addition, the data extraction unit 257 extracts a plurality of pieces of data of the ambient temperature T, the pressure P2 and the temperature T2 of the intermediate accumulator 30, the pressure P3 and the temperature T3 of the high-pressure accumulator 40, and the pressure P1 of the trailer 10 at a supply initiation (filling initiation) time of the hydrogen gas to the FCV 60, and a filling amount Q to the FCV 60 at termination (filling termination) time of supply of the hydrogen gas to the FCV 60 from the log data B as data necessary to calculate the inventory of the hydrogen gas at the individual timing on the basis of the log format of the log data B.

As the inventory B calculation process (S152), the inventory calculation unit 260 in the data center 200 calculates the inventory of the hydrogen gas at an individual timing set in advance to the hydrogen station 102 among a plurality of the individual timings set in advance to a plurality of the hydrogen stations 102 by using input log data of a plurality of parameters for every hydrogen station 102. Here, the inventory B of the hydrogen gas based on the log data B is calculated. A specific operation is as follows. The inventory calculation unit 260 reads out the extraction data stored in association with the identifier of the off-site ST(B) from the storage device 258. According to this, as the extraction data, a plurality of pieces of data of the ambient temperature T, the pressure P2 and the temperature T2 of the intermediate accumulator 30, the pressure P3 and the temperature T3 of the high-pressure accumulator 40, and the pressure P1 of the trailer 10 at supply initiation (filling initiation) time of the hydrogen gas to the FCV 60, and the filling amount Q to the FCV 60 at termination (filling termination) time of supply of the hydrogen gas to the FCV 60 are acquired. In addition, the inventory calculation unit 260 acquires the volume V1 of the accumulation container of the trailer 10, the volume V2 of the intermediate accumulator 30, and the volume V3 of the high-pressure accumulator 40 from the log format of the log data B. In addition, the inventory calculation unit 260 calculates the inventory of the hydrogen gas in the off-site ST(B) at termination (filling termination) time of supply of the hydrogen gas to the FCV 60 by using the extraction data and the volume of each of the accumulation containers. In the log data B, a value obtained by subtracting the filling amount Q to the FCV 60 at termination (filling termination) time of supply of the hydrogen gas to the FCV 60 from the inventory of the off-site ST(B) at initiation (filling initiation) time of supply of the hydrogen gas to the FCV 60 is calculated as the inventory of the off-site ST(B) at supply termination (filling termination) time of supply of the hydrogen gas to the FCV 60. Here, the weight (kg) of the hydrogen gas in each of the accumulation containers can also be obtained by the PVT method (volume method). Specifically, the density $\rho$ (P, T) of the hydrogen gas in an accumulation container can be calculated from a compression rate peculiar to hydrogen by using the pressure P and the temperature T of the accumulation container such as the trailer 10, the intermediate accumulator 30, and the high-pressure accumulator 40. The weight (kg) of the hydrogen gas in the accumulation container can be calculated by multiplying the density ρ (P, T) of the hydrogen gas in the accumulation container by the volume V of the accumulation container. With regard to the temperature of the intermediate accumulator 30 and the high-pressure accumulator 40, the temperatures T2 and T3 may be used. With regard to the temperature of the trailer 10, the ambient temperature T may be used. In addition, the inventory calculation unit 260 adds Weight 1 (kg) of the hydrogen gas accumulated in the trailer 10 at initiation (filling initiation) time of supply of the hydrogen gas to the FCV 60, Weight 2 (kg) of the hydrogen gas accumulated in the intermediate accumulator 30 at that time, and Weight 3 (kg) of the hydrogen gas accumulated in the high-pressure accumulator 40 at that time to calculate the inventory b (kg) of the hydrogen gas in the off-site ST(B) at initiation (filling initiation) time of supply of the hydrogen gas to the FCV 60. In addition, the inventory calculation unit 260 subtracts the filling amount Q to the FCV 60 at termination (filling termination) time of supply of the hydrogen gas to the FCV 60 from the inventory b of the hydrogen gas in the off-site ST(B) at the initiation (filling initiation) time of supply of the hydrogen gas to the FCV 60. According to this, the inventory calculation unit 260 calculates the inventory B (kg) of the hydrogen gas in the off-site ST(B) at the termination (filling termination) time of supply of the hydrogen gas to the FCV 60. An error may occur in the pressure P3 of the high-pressure accumulator 40 in a state in which the valve 44 is closed. Accordingly, it is preferable to use pressure data measured in a state in which the valve 44 is opened. At the initiation (filling initiation) time of supply of the hydrogen gas to the FCV 60, since the hydrogen gas is supplied from the high-pressure accumulator 40 to the FCV 60, the valve 44 is controlled to an opened state. Accordingly, in the off-site ST(B), when the pressure P3 of the high-pressure accumulator 40 at the initiation (filling initiation) time of supply of the hydrogen gas to the FCV 60 is used in the calculation of the inventory, the pressure P3 of the high-pressure accumulator 40 can be measured with high accuracy. The calculated inventory B is stored in the storage device 262.

As the data extraction process (S160), the data extraction unit 257 in the data center 200 extracts data necessary to calculate the inventory of the hydrogen gas in the hydrogen station 102 which becomes the base of the log data C from the received log data C. A specific operation is similar to the data extraction process (S140). The extracted extraction data is stored in the storage device 258 in association with the identifier of the hydrogen station 102.

For example, in the off-site ST(C), as illustrated in FIG. 8, time for which the hydrogen gas is unloaded from the trailer 10 to the intermediate accumulator 30 becomes the individual timing (time) at which the inventory is calculated. In the example illustrated in FIG. 8, as time during unloading, time at which the number of times of accumulation in the intermediate accumulator 30 is changed, for example, time at which the number of times is changed from zero to 1, and time at which the number of times is changed from 1 to 2 are set as an individual timing (time) at which the inventory is calculated. In addition, the data extraction unit 257 extracts a plurality of pieces of data of the pressure P1 of the trailer 10, the pressure P2 and the temperature T2 of the intermediate accumulator 30, the pressure P3 and the temperature T3 of the high-pressure accumulator 40, and the ambient temperature T at the time at which the number of times of accumulation in the intermediate accumulator 30 is changed from the log data C as data necessary to calculate the inventory of the hydrogen gas at the individual timing on the basis of the log format of the log data C.

As the inventory C calculation process (S162), the inventory calculation unit 260 in the data center 200 calculates the inventory of the hydrogen gas at an individual timing set in advance to the hydrogen station 102 among a plurality of the individual timings set in advance to a plurality of the hydrogen stations 102 by using input log data of a plurality of parameters for every hydrogen station 102. Here, the inventory C of the hydrogen gas based on the log data C is calculated. A specific operation is as follows. The inventory calculation unit 260 reads out the extraction data stored in association with the identifier of the off-site ST(C) from the storage device 258. According to this, as the extraction data, a plurality of pieces of data of the pressure P1 of the trailer 10, the pressure P2 and the temperature T2 of the intermediate accumulator 30, the pressure P3 and the temperature T3 of the high-pressure accumulator 40, and the ambient temperature T at the time at which the number of times of accumulation in the intermediate accumulator 30 is changed are acquired. In addition, the inventory calculation unit 260 acquires the volume V1 of the accumulation container of the trailer 10, the volume V2 of the intermediate accumulator 30, and the volume V3 of the high-pressure accumulator 40 from the log format of the log data C. In addition, the inventory calculation unit 260 calculates the inventory of the hydrogen gas in the off-site ST(C) at the time at which the number of times of accumulation in the intermediate accumulator 30 is changed by using the extraction data and the volume of each of the accumulation containers. Here, the weight (kg) of the hydrogen gas in each of the accumulation containers can also be obtained by the PVT method (volume method). In addition, the inventory calculation unit 260 adds Weight 1 (kg) of the hydrogen gas accumulated in the trailer 10 at the time at which the number of times of accumulation in the intermediate accumulator 30 is changed, Weight 2 (kg) of the hydrogen gas accumulated in the intermediate accumulator 30 at that time, and Weight 3 (kg) of the hydrogen gas accumulated in the high-pressure accumulator 40 to calculate the inventory C (kg) of the hydrogen gas in the off-site ST(C) at the time at which the number of times of accumulation in the intermediate accumulator 30 is changed. An error may occur in the pressure P1 of the trailer 10 in a state in which the valve 14 is closed. Accordingly, it is preferable to use pressure data measured in a state in which the valve 14 is opened. Since the time at which the number of times of accumulation in the intermediate accumulator 30 is changed is an unloading period of the hydrogen gas from the trailer 10 to the intermediate accumulator 30, the valve 14 is controlled to an opened state. Accordingly, in the off-site ST(C), when the time at which the hydrogen gas is unloaded from the trailer 10 to the intermediate accumulator 30 is set as the individual timing, the pressure P1 of the trailer 10 can be measured with high accuracy. The calculated inventory C is stored in the storage device 262.

As the sorting process (S170), the sorting unit 264 in the data center 200 inputs the inventory of the hydrogen gas in the hydrogen station 102 including the individual calculation timing at a time period for every time period set in advance and sorts the identification information of a plurality of the hydrogen stations in the order of less inventory at the time period for every time period. In addition to sorting based on the inventory, for example, the identification information may be sorted in the order of delivery routes, for example, in consideration of a distance and travel time between a shipping location and each off-site ST, the loading capacity of the trailer, and the like.

FIG. 9 is a view illustrating an example of sorting data in Embodiment 1. In the example illustrated in FIG. 9, as sorting data, definition is made in the order of a time period, an order, an off-site ST identifier, and an inventory (kg). In the example illustrated in FIG. 9, for example, the plurality of hydrogen stations 102 are listed in the order of less inventory of the hydrogen gas for every one hour from 0 minute to 59 minutes. In a frame of each time period, a hydrogen station 102 of which the inventory is not calculated may exist. In this case, the hydrogen station 102 of which the inventory is not calculated may be omitted in the list. For example, the example illustrated in FIG. 9 illustrates a case where the inventory of the hydrogen gas is less in the order of the off-site ST(C) having an inventory M1, the off-site ST(D) having an inventory M2, the off-site ST(A) having an inventory M3, . . . , and the off-site ST(K) having an inventory Mn at a time period from 13:00 to 13:59. In addition, the example illustrates a case where the inventory of the hydrogen gas is less in the order of the off-site ST(C) having an inventory m1, the off-site ST(A) having an inventory m2, the off-site ST(F) having an inventory m3, . . . , and the off-site ST(G) having an inventory mn, for example, at a time period from 14:00 to 14:59. The sorted sorting data is stored in the storage device 266.

As the sorting data transmission process (S172), the sorting data transmission unit 268 in the data center 200 outputs the identification information of the plurality of hydrogen stations 102 sorted for every time period in association with the inventory. A specific operation is as follows. The sorting data transmission unit 268 reads out the sorting data from the storage device 266, and transmits the sorting data to the server terminal 300 through the communication control circuit 250 over the network 2. For example, it is preferable that the sorting data is transmitted for every defined time period.

As the inventory-per-area data creation process (S174), the inventory-per-area data creation unit 270 in the data center 200 aggregates the inventory of the hydrogen station 102 pertaining to the same group of an area for every area.

FIG. 10 is a view illustrating an example of inventory-per-area data in Embodiment 1. In the example illustrated in FIG. 10, as the inventory-pare-area data, definition is made in the order of a time period, an area, an off-site ST identifier, and a total inventory (kg). In the example illustrated in FIG. 10, hydrogen stations 102 pertaining to each area, and the total inventory of inventories of the hydrogen stations 102 in the area are listed, for example, for every hour from 0 minute to 59 minutes. In a frame of each time period, a hydrogen stations 102 of which the inventory is not calculated may exist. In this case, with regard to the hydrogen station 102 of which the inventory is not calculated, a previously calculated inventory may be used. Alternatively, with regard to the hydrogen station 102 of which the inventory is not calculated may be omitted in the list. In the example illustrated in FIG. 10, for example, at a time period from 13:00 to 13:59, the off-site ST(A), the off-site ST(B), and the off-site ST(C) pertain to Area 1, and a total inventory MM1 of the inventories of the hydrogen stations 102 is shown. At the time period from 13:00 to 13:59, the off-site ST(D) and the off-site ST(E) pertain to Area 2, and a total inventory MM2 of inventories of the hydrogen stations 102 is shown. At the time period from 13:00 to 13:59, the off-site ST(O), the off-site ST(P), off-site ST(Q), and off-site ST(R) pertain to Area N, and a total inventory MMn of inventories of the hydrogen stations 102 is shown. The created inventory-per-area data for every time period is stored in the storage device 272.

As the inventory-per-area data output process (S176), the inventory-per-area data transmission unit 274 in the data center 200 outputs an aggregated result of a group to which the hydrogen stations 102 pertain to a plurality of the client terminals 100 of the plurality of hydrogen stations 102 over the network 2. A specific operation is as follows. The inventory-per-area data transmission unit 274 reads out the inventory-per-area data from the storage device 272 for every time period, and transmits the inventory-per-area data for every time period to the client terminals 100 and the server terminal 300 through the communication control circuit 250 over the network 2. For example, it is preferable that the inventory-per-area data is transmitted for every defined time period. Note that, division data obtained by dividing the inventory-per-area data for every area may be transmitted, or inventory-per-area data including information of all areas, for example, as illustrated in FIG. 10 may be transmitted to all of the client terminals 100 and the server terminal 300.

As the display process (S180), the server terminal 300 receives (inputs) data of the sorted identification information of the plurality of hydrogen stations 102 and the inventory of each of the hydrogen stations 102 for every time period from the data center 200 over the network 2. In addition, the server terminal 300 outputs the identification information of the plurality of hydrogen station sorted for every time period in association with the inventory. A specific operation is as follows. The server terminal 300 displays the sorting data received from the data center 200 on a monitor. According to this, the inventory at each time period can be acquired in real time. In addition, as illustrated in FIG. 9, since the hydrogen stations 102 are displayed in the order of less inventory of the hydrogen gas for every time period, a user who manages the server terminal 300 can make a determination as to when the hydrogen gas may be transported to which hydrogen station 102.

As described above, according to Embodiment 1, a plurality of pieces of data of automatically measured parameters are automatically sampled at a timing set in advance, and an inventory is automatically calculated at a timing set in advance. Accordingly, it is possible to avoid a reading error by a worker. In addition, even in log data sampled at a different timing and/or log data created in a different format, since inventories are listed for every time period, the inventory of the hydrogen gas stoked in each of the off-site ST can be more accurately grasped. In addition, since the inventories are sorted in the order of less inventory, the sorting can be used as a determination index as to when and how much amount of hydrogen gas should be transmitted to which off-site ST. Accordingly, it is possible to avoid a determination which relies on experience and is likely to result in an error.

In addition, the server terminal 300 receives (inputs) the inventory-per-area data from the data center 200 over the network 2. In addition, the server terminal 300 displays the inventory-per-area data on a monitor for every time period. According to this, a user who manages the server terminal 300 can make a determination as to which area may have a priority in transportation of the hydrogen gas.

In addition, each of the client terminal 100 receives (inputs) the inventory-per-area data from the data center 200 over the network 2. In addition, the client terminal 100 displays the inventory-per-area data on the monitor for every time period. According to this, a total inventory of own area can be acquired. Accordingly, in a case where the inventory in the own hydrogen station 102 is deficient or seems to be deficient, the total inventory can be used as a determination index as to whether filling with the hydrogen gas is possible at another hydrogen station 102 in the same area without waiting the subsequent carrying-in of the hydrogen gas. As a result, it is possible to transmit information indicating that when going to another hydrogen station 102 in the same area, charging with the hydrogen gas is possible to the arrived FCV 60, and it is possible to promote the FCV 60 to go to another hydrogen station 102 in the same area.

As described above, according to Embodiment 1, the inventory of the hydrogen gas in each off-site ST can be acquired with high accuracy.

Embodiment 2

In the above-described Embodiment 1, description has been given of a configuration in which the inventory of each of the hydrogen stations 102 is calculated in the data center 200, but there is no limitation thereto. In Embodiment 2, description will be given of a configuration in which a result obtained by calculating the inventory in each of the hydrogen station 102 is transmitted to the data center 200.

Figure 11:
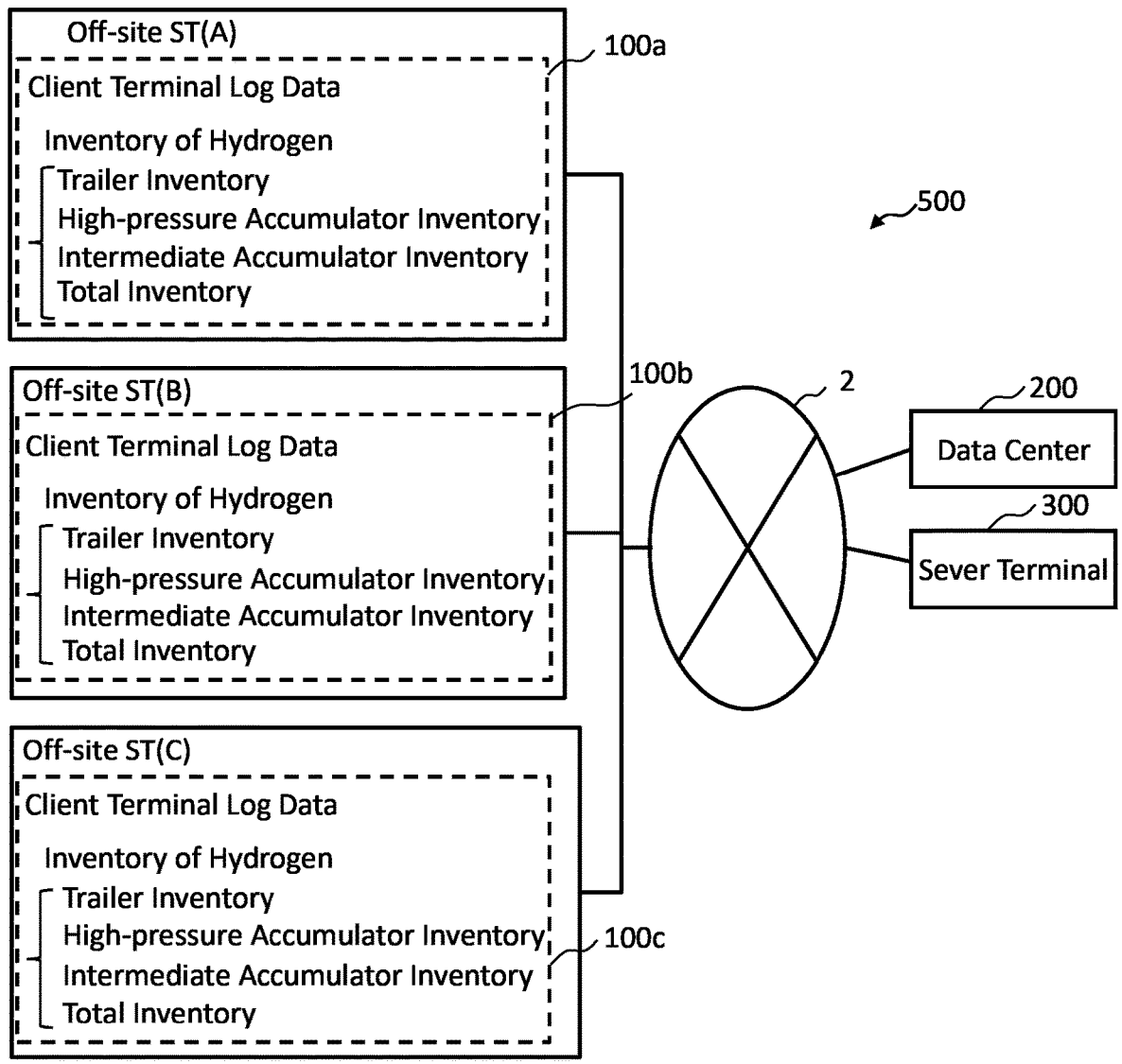
FIG. 11 is an example of a configuration diagram illustrating a configuration of a hydrogen gas inventory acquisition system in Embodiment 2.

FIG. 11 is an example of a configuration diagram illustrating a configuration of a hydrogen gas inventory acquisition system in Embodiment 2. In FIG. 11, in a hydrogen gas inventory acquisition system 500 in Embodiment 2, each of the client terminals 100a, 100b, and 100c calculates each inventory of hydrogen such as a trailer inventory, a high-pressure accumulator inventory, an intermediate accumulator inventory, and a total inventory.

Figure 12:
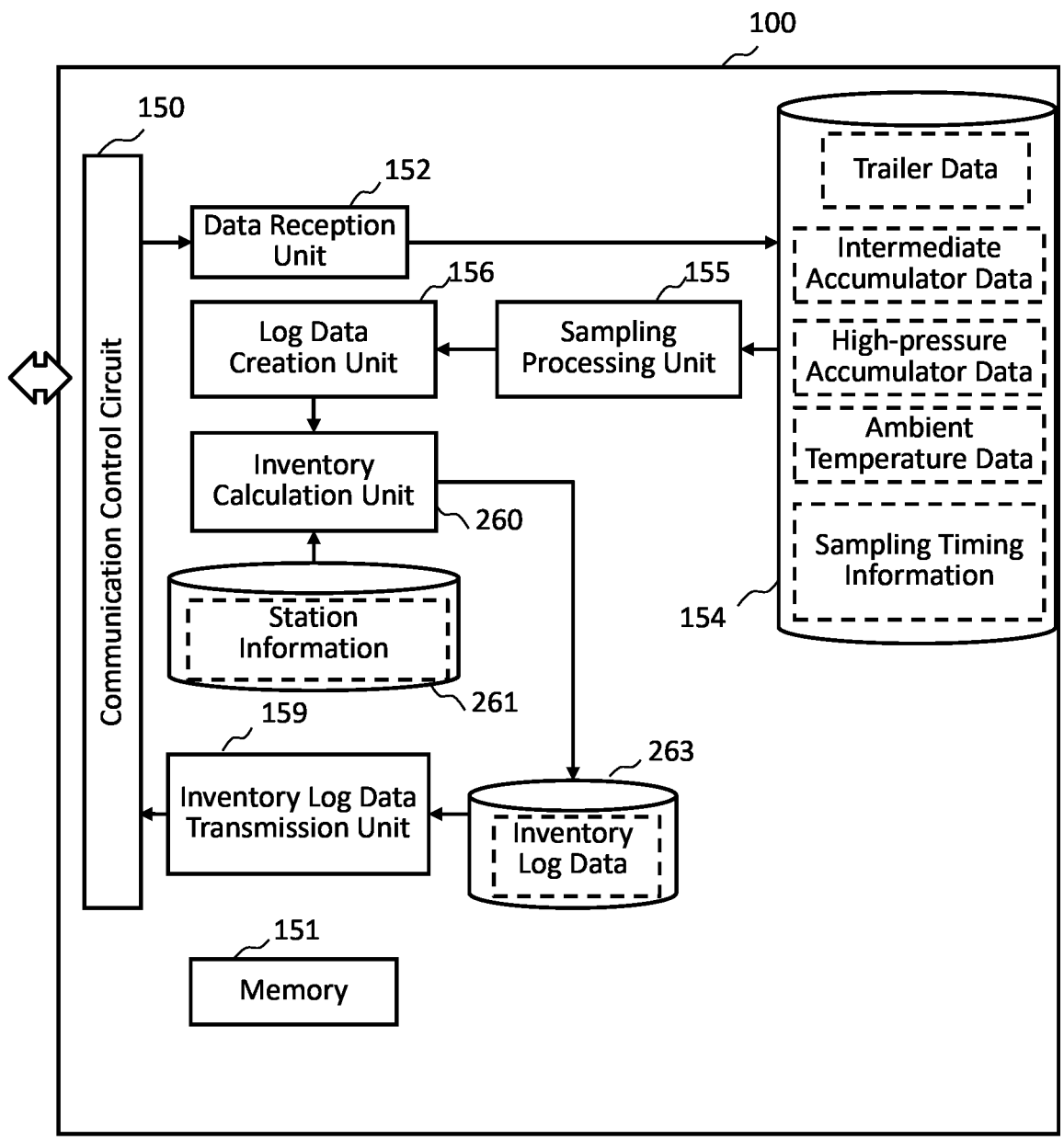
FIG. 12 is a configuration diagram illustrating an example of an internal configuration of a client terminal in Embodiment 2.

FIG. 12 is a configuration diagram illustrating an example of an internal configuration of the client terminal in Embodiment 2. In FIG. 12, an inventory calculation unit 260 and a storage device 261 are additionally disposed in the client terminal 100 of each of the hydrogen station 102 in addition to the configuration illustrated in FIG. 2. In addition, the capacity and the number of a trailer, an intermediate accumulator, and a high-pressure accumulator are stored in the storage device 261 as station information for calculating the inventory.

In Embodiment 2, when the log data described in Embodiment 1 is created, the inventory calculation unit 260 inputs the station information, and the inventory is calculated in accordance with the log data and the station information and is recorded as inventory log data. The inventory log data is stored in the storage device 263. A calculation method is similar to Embodiment 1 in that the PVT method is used. Note that, examples of the inventory log data include a trailer inventory that is an inventory of hydrogen that remains in the trailer 10, a high-pressure accumulator inventory that is an inventory of hydrogen that remains in the high-pressure accumulator 40, an intermediate accumulator inventory that is an inventory of hydrogen that remains in the intermediate accumulator 30, and a total inventory that is a total amount of the inventories. The inventory log data stored in the storage device 263 is transmitted to the data center 200 by an inventory log data transmission unit 159 that substitutes for the log data transmission unit 159 illustrated in FIG. 2.

Figure 13:
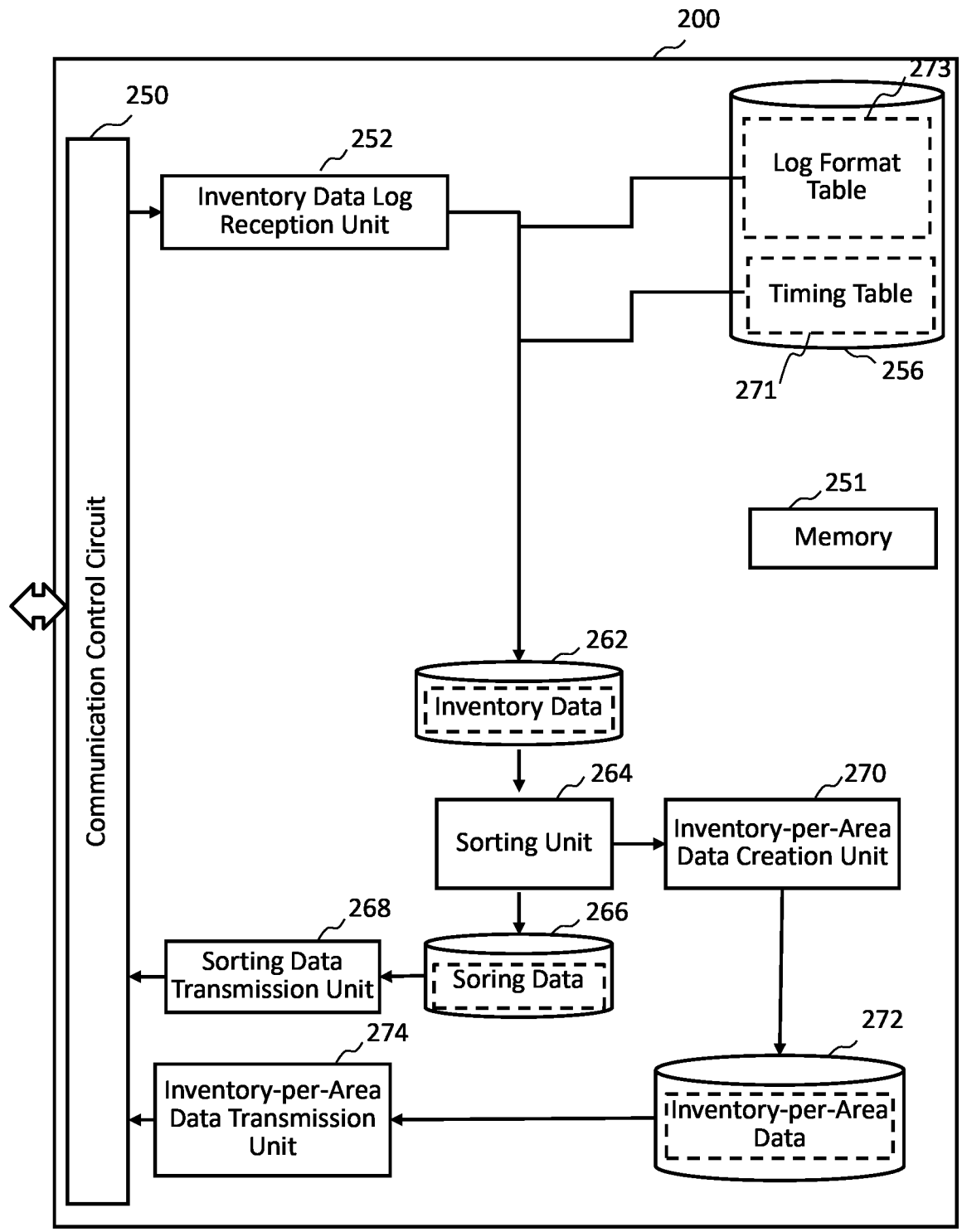
FIG. 13 is a configuration diagram illustrating an example of an internal configuration of a data center in Embodiment 2.

FIG. 13 is a configuration diagram illustrating an example of an internal configuration of the data center in Embodiment 2. In FIG. 13, the configuration in the data center 200 in Embodiment 2 may be a configuration in which the log data analysis unit 254, the data extraction unit 257, the inventory calculation unit 260, and the storage device 258 are omitted from the configuration illustrated in FIG. 3. In the data center 200, an inventory data log reception unit 252 that substitutes for the data log reception unit 252 illustrated in FIG. 3 receives the inventory log data. A reception timing is adjusted by the timing table 271. In addition, it is defined whether each piece of inventory data recorded in the inventory log data is the trailer inventory, the intermediate accumulator inventory, or the high-pressure accumulator inventory with reference to the log format table 273. The defined data is stored in the storage device 262 as inventory data. The inventory data is output to the sorting unit 264. The subsequent processing in the data center 200 is the same as described above.

FIG. 14 is a view illustrating an example of sorting data in Embodiment 2. In the example illustrated in FIG. 14, as the sorting data, a time period, an order, an off-site ST identifier, a total inventory (kg), a trailer inventory (kg), an intermediate accumulator inventory (kg), and a high-pressure accumulator inventory (kg) are defined in this order. In the example illustrated in FIG. 14, a plurality of the hydrogen stations 102 are listed in the order of less total inventory of the hydrogen gas, for example, for every hour from 0 minute to 59 minutes. The sorted sorting data is stored in the storage device 266.

When a result obtained by calculating the inventory in each of the hydrogen stations 102 is transmitted to the data center 200, even in the case of transmitting each piece of log data different in a format or the like, system complexity between each of the hydrogen stations 102 and the data center 200 can be reduced. In addition, a data communication amount transmitted from each of the hydrogen stations 102 to the data center 200 can be reduced. Accordingly in the data center 200, reception data decreases and a calculation process decreases, and thus a memory amount used in calculation can be reduced. In addition, in the data center 200, a simple configuration in which the inventory is sorted and is displayed is realized. Since the memory amount for calculation can be reduced, and line congestion can be avoided, a system trouble can be reduced. According to this, the management cost of the data center 200 or the maintenance cost due to the trouble can be reduced.

Embodiment 3

In Embodiment 3, description will be given of a configuration in which the inventory of the hydrogen gas is managed by a pressure. In Embodiment 3, the configuration of the client terminal 100 may be the same as in FIG. 2. The configuration of the data center 200 may be the same as in FIG. 13. In Embodiment 3, description will be given of a hydrogen gas inventory management device that includes each of the client terminals 100 and the data center 200. The hydrogen gas inventory management device in Embodiment 3 manages the inventory of the hydrogen gas in a plurality of off-site hydrogen stations.

In the client terminal 100 of each of the hydrogen stations 102, the log data creation unit 156 creates log data obtained by recording a pressure value sampled at an individual sampling timing set to the hydrogen station in combination with identification information of the hydrogen station from the pressure value measured by a pressure gauge disposed in the own hydrogen station. A method of creating the log data is similar to Embodiment 1. However, in Embodiment 3, temperature data is not necessary. Data of a trailer pressure, an intermediate accumulator pressure, and a high-pressure accumulator pressure is acquired, and is recorded as the log data. The log data is transmitted to the data center 200 by the log data transmission unit 159.

In the data center 200, the data log reception unit 252 receives the data log. A reception timing is adjusted by the timing table 271. In addition, it is possible to define whether each piece of pressure data recorded in the log data is the pressure of the trailer pressure, the intermediate accumulator pressure, or the high-pressure accumulator pressure with reference to the log format table 273. The defined data is stored in the storage device 262 as pressure data. The inventory data is output to the sorting unit 264.

The sorting unit 264 acquires a pressure value of the hydrogen gas in each of the hydrogen stations 102 from the log data creation unit every set time period, and sorts the identification information by using the pressure value.

FIG. 15 is a view illustrating an example of sorting data in Embodiment 3. In the example illustrated in FIG. 15, as the sorting data, the time period, the order, the off-site ST identifier, the trailer pressure (MPa), the intermediate accumulator pressure (MPa), and the high-pressure accumulator pressure (MPa) are defied in this order. In the example illustrated in FIG. 15, a plurality of the hydrogen stations 102 are listed in the order of lower pressure of the hydrogen gas, for example, for every hour 0 minute to 59 minutes. Among the trailer pressure, the intermediate accumulator pressure, and the high-pressure accumulator pressure, which pressure will be based for determination of a level of the pressure may be set in advance. The sorted sorting data is stored in the storage device 266.

The sorting data transmission unit 268 (sorting data output unit) outputs the sorting data including the identification information sorted by the sorting unit 264 and the pressure value.

As described above, the hydrogen gas inventory management is not limited to the weight management, and the pressure management may be performed. According to this, the number of pieces of data can be reduced.

Hereinbefore, the embodiments have been described with reference to specific examples. However, the invention is not limited to the specific examples.

In addition, description of portions which are not directly necessary for description of the invention such as the device configuration, and the control method is omitted, but a necessary device configuration or a necessary control method may be appropriately selected and used.

In addition, all hydrogen gas inventory acquisition methods, all hydrogen gas inventory acquisition devices, and all hydrogen gas inventory acquisition systems which include the elements of the invention and can be appropriately redesigned by those skilled in the art are included in the scope of the invention.

REFERENCE SIGNS LIST

- 10: TRAILER
- 12, 32, 42: PRESSURE GAUGE
- 14, 34, 36, 44, 46: VALVE
- 20: COMPRESSOR
- 30: INTERMEDIATE ACCUMULATOR
- 33, 43, 48: THERMOMETER
- 40: HIGH-PRESSURE ACCUMULATOR
- 50: DISPENSER
- 60: FCV
- 100: CLIENT TERMINAL
- 102: HYDROGEN STATION
- 104: CONTROL CIRCUIT
- 150: COMMUNICATION CONTROL CIRCUIT
- 151: MEMORY
- 152: DATA RECEPTION UNIT
- 155: SAMPLING PROCESSING UNIT
- 154, 158: STORAGE DEVICE
- 156: LOG DATA CREATION UNIT
- 159: LOG DATA TRANSMISSION UNIT
- 200: DATA CENTER
- 250: COMMUNICATION CONTROL CIRCUIT
- 251: MEMORY
- 252: DATA LOG RECEPTION UNIT
- 254: LOG DATA ANALYSIS UNIT
- 257: DATA EXTRACTION UNIT
- 260: INVENTORY CALCULATION UNIT
- 264: SORTING UNIT
- 256, 258, 261, 262, 266, 272: STORAGE DEVICE
- 268: SORTING DATA TRANSMISSION UNIT
- 270: INVENTORY-PER-AREA DATA CREATION UNIT
- 271: TIMING TABLE
- 273: LOG FORMAT TABLE
- 274: INVENTORY-PER-AREA DATA TRANSMISSION UNIT
- 300: SERVER TERMINAL
- 500: HYDROGEN GAS INVENTORY ACQUISITION SYSTEM

The invention claimed is:

1. A hydrogen gas inventory acquisition system configured to acquire an inventory of a hydrogen gas in a plurality of hydrogen stations, the system comprising:

a log data creation device configured to create log data obtained by recording each parameter data sampled at an individual sampling timing set individually to each hydrogen station of the plurality of hydrogen stations in combination with identification information of each of the plurality of hydrogen stations from a plurality of parameter data measured by a plurality of meters disposed in the each hydrogen station to calculate an inventory of the hydrogen gas in the each hydrogen station; and an inventory calculation device configured to calculate the inventory of the hydrogen gas at an individual calculation timing set individually to the each hydrogen station by using the log data, wherein the individual sampling timings are different for the each hydrogen station.

2. The hydrogen gas inventory acquisition system according to claim 1, wherein the each hydrogen station pertains to any one group among a plurality of groups, and the system further comprising, an inventory-per-group creation device configured to create inventory-per-group data by aggregating an inventory of each hydrogen station pertaining to a group among the plurality of groups for the group, and an inventory-per-group data transmission device configured to transmit the inventory-per-group data to the each hydrogen station.

3. The hydrogen gas inventory acquisition system according to claim 1, wherein the each hydrogen station includes an accumulator configured to accumulate a hydrogen gas, and the plurality of parameter data includes pressure data of the hydrogen gas inside the accumulator, and temperature data capable of being estimated as a temperature of the hydrogen gas inside the accumulator.

4. The hydrogen gas inventory acquisition system according to claim 1,

29 wherein the each hydrogen station includes a compressor configured to compress a hydrogen gas, and
the individual calculation timing is an operation stoppage timing of the compressor.

5. The hydrogen gas inventory acquisition system according to claim 1,
wherein the individual calculation timing is time when supply of the hydrogen gas to a fuel cell vehicle is terminated.

6. The hydrogen gas inventory acquisition system according to claim 1,
wherein the each hydrogen station includes an intermediate accumulator configured to accumulate a hydrogen gas unloaded from a trailer configured to transport the hydrogen gas, and a high-pressure accumulator configured to accumulate a hydrogen gas compressed to a higher pressure in comparison to the intermediate accumulator, and
as the individual calculation timing, termination time of unloading of the hydrogen gas from the trailer to the intermediate accumulator is used.

7. The hydrogen gas inventory acquisition system according to claim 1,
wherein the log data creation device is disposed in the each hydrogen station, the inventory calculation device is disposed in a data center different from the each hydrogen station, and the log data creation device and the inventory calculation device are connected to each other over a network.

8. The hydrogen gas inventory acquisition system according to claim 1,
wherein the log data creation device and the inventory calculation device are disposed in the each hydrogen station.

9. The hydrogen gas inventory acquisition system according to claim 1, further comprising:
a sorting device configured to acquire inventory data of the hydrogen gas in the each hydrogen station from the inventory calculation device for each set time period, and configured to sort the identification information by using the inventory; and
a sorting data output device configured to output sorting data including a sorted identification information and the inventory data from the sorting device.

10. A hydrogen gas inventory acquisition method of acquiring an inventory of a hydrogen gas in a plurality of hydrogen stations, the method comprising:
creating log data obtained by recording each parameter data sampled at an individual sampling timing set individually to each hydrogen station of the plurality of hydrogen stations in combination with identification information of the each hydrogen station from a plurality of parameter data measured by a plurality of meters disposed in the each hydrogen station to calculate an inventory of the hydrogen gas in the each hydrogen station;
calculating the inventory of the hydrogen gas at an individual calculation timing set individually to the each hydrogen station by using the log data;
acquiring inventory data of the hydrogen gas in the each hydrogen station on the basis of the inventory calculated in the calculating the inventory for each set time period, and sorting the identification information by using the inventory; and
outputting sorting data including a sorted identification information and the inventory data,

30 wherein the individual sampling timings are different for the each hydrogen station.

11. A hydrogen gas inventory acquisition device configured to acquire an inventory of a hydrogen gas in a plurality of hydrogen stations, the device comprising:
a log data creator configured to create log data obtained by recording each parameter data sampled at an individual sampling timing set individually to each hydrogen station of the plurality of hydrogen stations in combination with identification information of the each hydrogen station from a plurality of parameter data measured by a plurality of meters disposed in the each hydrogen station to calculate an inventory of the hydrogen gas in the each hydrogen station;
an inventory calculator configured to calculate the inventory of the hydrogen gas at an individual calculation timing set individually to the each hydrogen station by using the log data;
a sorter configured to acquire inventory data of the hydrogen gas in the each hydrogen station from the inventory calculator for each set time period, and configured to sort the identification information by using the inventory; and
a sorting data output configured to output sorting data including a sorted identification information and the inventory data from the sorter,
wherein the individual sampling timings are different for the each hydrogen station.

12. A hydrogen gas inventory management system configured to manage an inventory of a hydrogen gas in a plurality of hydrogen stations, the system comprising:
a log data creation device configured to create log data obtained by recording a pressure value sampled at an individual sampling timing set individually to each hydrogen station of the plurality of hydrogen stations in combination with identification information of the each hydrogen station from pressure values measured by a pressure gauge disposed in the each hydrogen station;
a sorting device configured to acquire the pressure value of the hydrogen gas in the each hydrogen station from the log data creation device for each set time period, and configured to sort the identification information by using the pressure value; and
a sorting data output device configured to output sorting data including a sorted identification information and the pressure value from the sorting device,
wherein the individual sampling timings are different for the each hydrogen station.

13. A hydrogen gas inventory acquisition method comprising:
inputting log data of a plurality of parameters sampled from data of the plurality of parameters measured by a plurality of meters disposed in a hydrogen station among a plurality of hydrogen stations configured to supply a hydrogen gas to a fuel cell vehicle (FCV), at a first individual timing set in advance and individually to a terminal in the hydrogen station among a plurality of first individual timings set in advance to a plurality of terminals in the plurality of hydrogen stations in combination with identification information of the hydrogen station through the terminal in the hydrogen station over a network for each hydrogen station among the plurality of hydrogen stations;
calculating an inventory of the hydrogen gas at a second individual timing set in advance and individually to the hydrogen station among a plurality of second individual timings set in advance to the plurality of hydrogen stations by using an input log data of the plurality of parameters for the each hydrogen station;

inputting the inventory of the hydrogen gas in the hydrogen station in which the second individual timing is included in a time period for each time period set in advance, and sorting a plurality of identification information of the plurality of hydrogen stations in the order of less inventory at the time period for each time period; and outputting a plurality of sorted identification information of the plurality of hydrogen stations in association with the inventory for each time period, wherein the plurality of first individual timings and the plurality of second individual timings are different.

14. A hydrogen gas inventory acquisition device comprising:

a data input configured to input log data of a plurality of parameters sampled from data of the plurality of parameters measured by a plurality of meters disposed in a hydrogen station among a plurality of hydrogen stations which supply a hydrogen gas to a fuel cell vehicle (FCV), at a first individual timing set in advance and individually to a terminal in the hydrogen station among a plurality of first individual timings set in advance to a plurality of terminals in the plurality of hydrogen stations in combination with identification information of the hydrogen station through the terminal in the hydrogen station over a network for each hydrogen station among the plurality of hydrogen stations;

an inventory calculator configured to calculate an inventory of the hydrogen gas at a second individual timing set in advance and individually to the hydrogen station among a plurality of second individual timings set in advance to the plurality of hydrogen stations by using an input log data of the plurality of parameters for the each hydrogen station;

a sorter configured to input the inventory of the hydrogen gas in the hydrogen station in which the second individual timing is included in a time period for each time period set in advance, and configured to sort a plurality of identification information of the plurality of hydrogen stations in the order of less inventory at the time period for each time period; and an output configured to output data of a plurality of sorted identification information of the plurality of hydrogen stations and the inventory of each of the plurality of hydrogen stations for each time period, wherein the first individual timings and the second individual timings are different.

15. A hydrogen gas inventory acquisition system comprising:

a plurality of client terminals disposed in a plurality of hydrogen stations which supply a hydrogen gas to a fuel cell vehicle (FCV), at least one client terminal of the plurality of client terminals being disposed in each of the plurality of hydrogen stations, the plurality of client terminals each being configured to sample a plurality of parameters from data of the plurality of parameters measured by a plurality of meters disposed in a hydrogen station of the plurality of hydrogen stations at a first individual timing set to the hydrogen station among a plurality of first individual timings each being set in advance and individually to a different one of the plurality of hydrogen stations, the plurality of client terminals each being configured to create log data of a plurality of parameters sampled, and the plurality of client terminals each being configured to be connectable to a network;

a data input disposed in a data center, and configured to input the log data of the plurality of parameters sampled from the plurality of meters at the first individual timing in each of the plurality of hydrogen stations in combination with identification information of a hydrogen station from the plurality of client terminals over a network;

an inventory calculator disposed in the data center, and configured to calculate an inventory of a hydrogen gas at a second individual timing set in advance and individually to the hydrogen station among a plurality of second individual timings each being set in advance to a different one of the plurality of hydrogen stations by using an input log data of the plurality of parameters for each hydrogen station;

a sorter disposed in the data center, and configured to input the inventory of the hydrogen gas in the hydrogen station in which the second individual timing is included at a time period for each time period set in advance and to sort a plurality of identification information of the plurality of hydrogen stations in the order of less inventory at the time period for the each time period; and a server device configured to input data of a plurality of sorted identification information of the plurality of hydrogen stations and the inventory of each of the plurality of hydrogen stations for the each time period from the data center over the network, and to output the plurality of sorted identification information of the plurality of hydrogen stations in association with the inventory for the each time period, wherein the plurality of first individual timings and the plurality of second individual timings are different.

* * * * *